United States Patent
Grossman et al.

(10) Patent No.: US 9,977,591 B2
(45) Date of Patent: May 22, 2018

(54) IMAGE WITH AUDIO CONVERSATION SYSTEM AND METHOD

(71) Applicants: Andrew Grossman, Hopkins, MN (US); Kenneth F. Krutsch, Minnetonka, MN (US)

(72) Inventors: Andrew Grossman, Hopkins, MN (US); Kenneth F. Krutsch, Minnetonka, MN (US)

(73) Assignee: AMBIENT CONSULTING, LLC, Minneapolis, MN (US)

( * ) Notice: Subject to any disclaimer, the term of this patent is extended or adjusted under 35 U.S.C. 154(b) by 470 days.

(21) Appl. No.: 14/179,602

(22) Filed: Feb. 13, 2014

(65) Prior Publication Data
US 2015/0095804 A1 Apr. 2, 2015

Related U.S. Application Data

(63) Continuation-in-part of application No. 14/043,385, filed on Oct. 1, 2013.

(51) Int. Cl.
| | | |
|---|---|---|
| *G06F 3/0486* | (2013.01) | |
| *H04L 12/58* | (2006.01) | |
| *G06F 3/0484* | (2013.01) | |
| *G06F 3/0482* | (2013.01) | |
| *G06F 3/0488* | (2013.01) | |

(52) U.S. Cl.
CPC ........ *G06F 3/04883* (2013.01); *G06F 3/0482* (2013.01); *G06F 3/04845* (2013.01); *H04L 51/10* (2013.01); *G06F 2203/04806* (2013.01)

(58) Field of Classification Search
CPC ... G06F 3/04883; G06F 3/0482; H04L 65/403
USPC .......................................... 709/206
See application file for complete search history.

(56) References Cited

U.S. PATENT DOCUMENTS

| 7,072,941 B2 | 7/2006 | Griffin et al. |
| 7,987,492 B2 | 7/2011 | Liwerant et al. |
| 8,199,188 B2 * | 6/2012 | Amling ................. H04N 5/232 348/231.3 |

(Continued)

FOREIGN PATENT DOCUMENTS

EP 1729173 12/2006

OTHER PUBLICATIONS

Oct. 7, 2015 USPTO Office Action (U.S. Appl. No. 14/521,576).

(Continued)

*Primary Examiner* — Nicholas Taylor
*Assistant Examiner* — Chong G Kim
(74) *Attorney, Agent, or Firm* — Tysver Beck Evans, PLLC

(57) ABSTRACT

A system and method are presented to allow audio communication between users concerning an image. The originator of the communication uses a mobile device app to select an image and record an audio commentary. The image, audio commentary, and metadata are submitted to a cloud server for storage. The app uses the server to analyze a recipient address to determine the preferred mode of delivery. If the recipient is a known user of the app, the file is delivered without combining the image, audio commentary, and metadata into a standard movie file. Otherwise, the originator's app delivers the file through MMS or e-mail for the recipient as a movie file for viewing using a standard video player.

17 Claims, 23 Drawing Sheets

(56) References Cited

U.S. PATENT DOCUMENTS

| | | |
|---|---|---|
| 8,225,335 B2 | 7/2012 | Glenner et al. |
| 8,606,297 B1 | 12/2013 | Simkhai et al. |
| 8,701,020 B1 | 4/2014 | Fulcher et al. |
| 9,031,963 B2 | 5/2015 | Anand et al. |
| 9,042,923 B1 | 5/2015 | Mirho |
| 2002/0099552 A1 | 7/2002 | Rubin et al. |
| 2004/0199922 A1* | 10/2004 | Krutsch ............ G06F 17/30557 719/310 |
| 2004/0267387 A1 | 12/2004 | Samadani |
| 2005/0008343 A1* | 1/2005 | Frohlich ............... H04N 1/0044 386/239 |
| 2005/0108233 A1 | 5/2005 | Metsatahti et al. |
| 2005/0216568 A1 | 9/2005 | Walkush et al. |
| 2006/0008256 A1 | 1/2006 | Khedouri et al. |
| 2006/0041848 A1 | 2/2006 | Kira |
| 2006/0148500 A1* | 7/2006 | Glenner ............ H04M 1/72533 455/517 |
| 2007/0143791 A1 | 6/2007 | Sammarco |
| 2007/0173267 A1 | 7/2007 | Klassen et al. |
| 2007/0198925 A1 | 8/2007 | He et al. |
| 2007/0300260 A1* | 12/2007 | Holm ................... H04N 5/4401 725/47 |
| 2008/0028023 A1* | 1/2008 | Locke ................. H04L 65/4015 709/203 |
| 2008/0092047 A1 | 4/2008 | Fealkoff et al. |
| 2008/0146254 A1 | 6/2008 | Groeger |
| 2008/0307322 A1 | 12/2008 | Stochosky et al. |
| 2009/0225788 A1* | 9/2009 | Kephart ................. G11B 27/10 370/503 |
| 2009/0254459 A1 | 10/2009 | Williams et al. |
| 2010/0029335 A1 | 2/2010 | Vartanian |
| 2010/0199182 A1 | 8/2010 | Lanza et al. |
| 2010/0262618 A1* | 10/2010 | Hedinsson ........ G06F 17/30053 707/770 |
| 2011/0087749 A1 | 4/2011 | Swink et al. |
| 2011/0087972 A1 | 4/2011 | Swink et al. |
| 2011/0106721 A1 | 5/2011 | Nickerson et al. |
| 2011/0131610 A1 | 6/2011 | Lee et al. |
| 2011/0173540 A1 | 7/2011 | Britton et al. |
| 2011/0264532 A1 | 10/2011 | Chan et al. |
| 2012/0066594 A1* | 3/2012 | Gavade ............ H04N 21/2743 715/716 |
| 2012/0150698 A1* | 6/2012 | McClements, IV . G06Q 10/101 705/27.2 |
| 2012/0151320 A1* | 6/2012 | McClements, IV . G06Q 10/101 715/230 |
| 2012/0157134 A1 | 6/2012 | Lee et al. |
| 2012/0179978 A1 | 7/2012 | Klassen et al. |
| 2012/0189282 A1 | 7/2012 | Wyatt et al. |
| 2012/0190388 A1 | 7/2012 | Castleman et al. |
| 2012/0204191 A1 | 8/2012 | Shia et al. |
| 2012/0209907 A1 | 8/2012 | Andrews et al. |
| 2012/0284426 A1* | 11/2012 | Smith .................... H04W 4/00 709/248 |
| 2012/0290907 A1* | 11/2012 | Smith ............... G06F 17/30268 715/203 |
| 2012/0317499 A1 | 12/2012 | Shen |
| 2012/0321271 A1* | 12/2012 | Baldwin .............. H04N 9/8715 386/201 |
| 2013/0013699 A1 | 1/2013 | Huxley |
| 2013/0022330 A1* | 1/2013 | Carter .............. H04N 21/41407 386/224 |
| 2013/0091205 A1* | 4/2013 | Kotler ................ H04L 65/4015 709/204 |
| 2013/0173531 A1* | 7/2013 | Rinearson ......... G06F 17/30011 707/608 |
| 2013/0178961 A1* | 7/2013 | Ly .......................... G11B 27/34 700/94 |
| 2013/0263002 A1* | 10/2013 | Park ...................... G06F 3/0484 715/719 |
| 2013/0283144 A1 | 10/2013 | Roh et al. |
| 2014/0063174 A1* | 3/2014 | Junuzovic ............ G06Q 10/101 348/14.02 |
| 2014/0073298 A1* | 3/2014 | Rossmann .............. H04W 4/00 455/414.2 |
| 2014/0089415 A1* | 3/2014 | Huang ................... H04L 67/06 709/205 |
| 2014/0146177 A1* | 5/2014 | Pacor ............... H04N 21/21805 348/157 |
| 2014/0150042 A1* | 5/2014 | Pacor ............... H04N 21/21805 725/116 |
| 2014/0163980 A1* | 6/2014 | Tesch ..................... G10L 21/10 704/235 |
| 2014/0164927 A1* | 6/2014 | Salaverry ............. H04N 1/2112 715/727 |
| 2014/0344712 A1 | 11/2014 | Okazawa et al. |
| 2014/0348394 A1* | 11/2014 | Salaverry ............. H04N 1/2112 382/112 |
| 2015/0039706 A1 | 2/2015 | Zilmer et al. |
| 2015/0095433 A1 | 4/2015 | Grossman et al. |
| 2015/0281243 A1 | 10/2015 | Das et al. |
| 2015/0282115 A1 | 10/2015 | Pitt et al. |
| 2015/0282282 A1 | 10/2015 | Breuer et al. |
| 2016/0006781 A1* | 1/2016 | Glenner ............ H04M 1/72533 709/217 |
| 2016/0100149 A1 | 4/2016 | Sharma et al. |

OTHER PUBLICATIONS

Dec. 30, 2014 PCT Search Report (Serial No. PCT/US2014/058588).
Feb. 12, 2016 USPTO Office Action (U.S. Appl. No. 14/227,032).
Feb. 19, 2015 PCT Search Report (Serial No. PCT/US2014/058523).
Apr. 14, 2016 PCT Preliminary Examination Report (Serial No. PCT/US2014/058523).
Apr. 14, 2016 PCT Preliminary Examination Report (Serial No. PCT/US2014/058588).
Apr. 23, 2015 USPTO Office Action (U.S. Appl. No. 14/227,032).
Mar. 2, 2015 USPTO Office Action (U.S. Appl. No. 14/043,385).
Nov. 28, 2016 USPTO Office Action (U.S. Appl. No. 14/542,599).
Mar. 7, 2016 USPTO Office Action (U.S. Appl. No. 14/043,385).
Jan. 13, 2017 USPTO Office Action (U.S. Appl. No. 14/227,032).

* cited by examiner

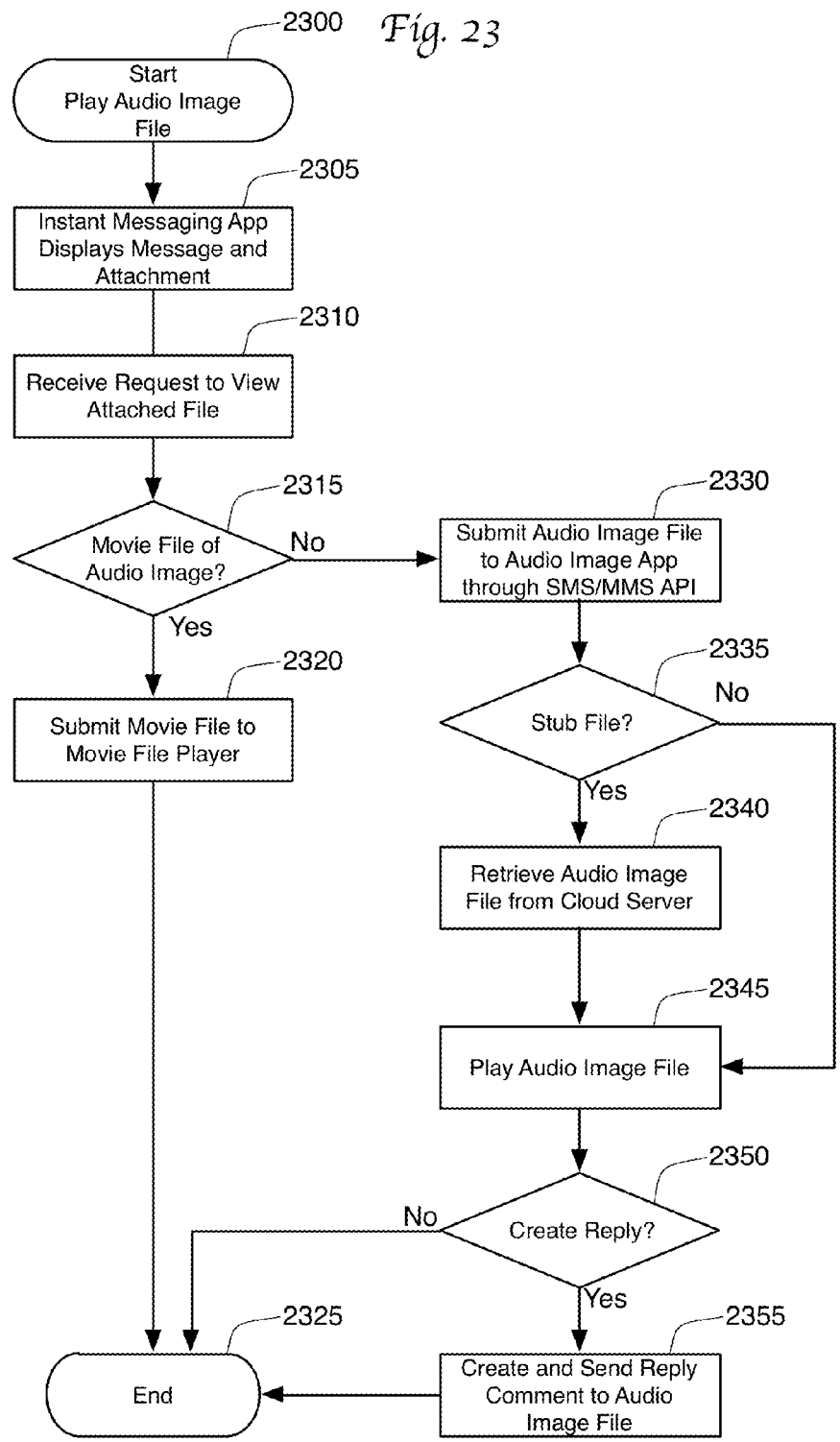

IMAGE WITH AUDIO CONVERSATION SYSTEM AND METHOD

RELATED APPLICATION

This application is a continuation-in-part to U.S. patent application Ser. No. 14/043,385, filed on Oct. 1, 2013, which is hereby incorporated by reference. This application is also related to the content found in U.S. patent application Ser. Nos. 13/832,177; 13/832,744; 13/834,347; all filed on Mar. 15, 2013, and U.S. patent application Ser. No. 13/947,016, filed on Jul. 19, 2013, all of which are hereby incorporated by reference.

FIELD OF THE INVENTION

The present application relates to the field of image-centered communication between users. More particularly, the described embodiments relate to a system and method for bi-directional communications centered on a visual image element including still image, a video clip, or even a group of image elements.

SUMMARY

One embodiment of the present invention provides audio communication between users concerning an image. The originator of the communication uses an app operating on a mobile device to create or select a photograph or other image. The same app is then used to attach an audio commentary to the image. The app encodes the audio commentary and the image together into a video file that can be viewed by video players included with modern mobile devices. This video file is one example of an "audio image" file used by the present invention.

The originator can then select one or more recipients to receive the video file. Recipients are identified by e-mail addresses, cell phone numbers, or user identifiers used by a proprietary communication system. The app analyzes each recipient address to determine the preferred mode of delivery for the video file. If the recipient also uses the app, the file is delivered through the proprietary communication system and received by the app on the recipient's mobile device. Otherwise, the file is delivered through MMS (if the recipient is identified by a telephone number) or through e-mail (if the recipient is identified by an e-mail address). Regardless of how the file is sent, a message containing the file and the particulars of the transmission are sent to the server managing the proprietary communication system.

When the file is sent through MMS or e-mail, it is accompanied by a link that allows the recipient to download an app to their mobile device to continue the dialog with the originator. When the link is followed, the user can download the app. Part of the set-up process for the app requires that new users identify their e-mail address and cell phone. This set-up information is communicated to the proprietary server, which can then identify audio image messages that were previously sent to the recipient through either e-mail or MMS message. Those audio image messages are then presented through an in-box in the app, where they can be selected for downloading and presentation to the newly enrolled user.

All recipients of the audio image file can play the file in order to view the image and hear the originator's audio commentary. Recipients using the app on their mobile devices can record a reply audio commentary. This reply audio is then encoded by the app into a new video file, where the reply audio is added to the beginning of the previous audio track and the video track remains a static presentation of the originally selected image. This new video file can be returned to the originator, allowing the originator to create a new response to the reply audio.

In some embodiments, enhancements can be made to the visual element that is the subject of the audio commentary. These enhancements can be visual augmentations that are presented on top of the visual element. For example, the sender can select a point on, or trace a path over the visual image using the touchscreen input of the sender's mobile device. The selecting locations and paths can be used to present to the recipient as a visual overlay over the original image. The overlay can be static so that the audio image is presented as a static image combining the original image and the overlay, or can be animated so that the overlay is animated to correspond to the timing of the sender's audio commentary. Enhancements can also include zooming or cropping to a portion of the original image, which can also be presented as a static change to the original image or an animated change that is timed to correspond to the sender's audio commentary. If the visual augmentations are presented in an animated fashion, they can be recorded directly into the video file that comprises the audio-image file. Alternatively, the visual augmentations can be stored as metadata sent to the recipient's audio-image app, which is then responsible for converting the metadata into the appropriate animations when presenting the audio-image file to the recipient.

In other embodiments, a group of images can be selected for inclusion in a single audio-image. The sender selects the groups, and then indicates the order in which the images should be presented. The user starts to record the audio commentary while viewing the first image, and then provides input to the mobile device when to switch to the next image. The timed-transitions between grouped images can be recorded into a video file by the sending device, or be recorded as metadata for translation by the app on the recipient's device. Similarly, the sender may elect to convert a video file into an audio-image with audio commentary. In this case, the sender may record the audio commentary while viewing the video file. Alternatively, the sender may manually scrub the video playback, back-and-forth, while recording the audio commentary, or even specify a sequence of video frames to loop continuously during the recordation of the audio commentary. If the audio-image app is creating a video file for transmission to the recipient, the app de-emphasizes the original audio track of the image and lays the audio commentary over that audio track such that the sender's comments are understandable while watching the video file. The audio-image app could also simply include the audio commentary as a separate track within the audio-image file that is identified through metadata including with that file.

It is also possible for a sending audio-image app to communicate with a recipient audio-image app directly through the SMS/MMS services provide on standard mobile devices. These services may include an API that allows a user using the standard MMS messaging interface on their mobile device to request that the audio-image app create a file for transmission over MMS. The standard mobile device messaging interface would transfer control to the audio-image app for creation of the audio-image file and then transmit the file as part of a standard MMS message. At the recipient's device, the MMS messaging interface would then transfer control to the audio-image app when the recipient asked to view the audio-image file. In one embodiment, this is accomplished by created a defined file-type for the audio-image file, and associating that file type through the mobile device operating system with the audio-image app. When the user wishes to create an attachment to an MMS message of that type, or has received an MMS message with that type of attachment, the messaging interface would transfer control to the audio-image app. This would obviate the need for a proprietary communication system for the transfer of audio-image files between audio-image apps. In another embodiment, the SMS or MMS text string will act as meta-data, or a reference link, to additional content and/or instructions for further processing by the receiving audio-image app. This meta-data or reference link can co-exist with an actual SMS text message being sent between the parties. This allows the text message to be viewable within the default text-messaging app even on devices without the audio-image app installed. When the message is received with a device having the audio-image app, the meta-data or reference link can be used to launch the audio-image app and allow the user the full audio-image app experience.

BRIEF DESCRIPTION OF THE DRAWINGS

FIG. 23 is a flow chart showing a method of receiving and playing an audio-image file over an existing messaging system.

DETAILED DESCRIPTION

System 100

Figure 1:
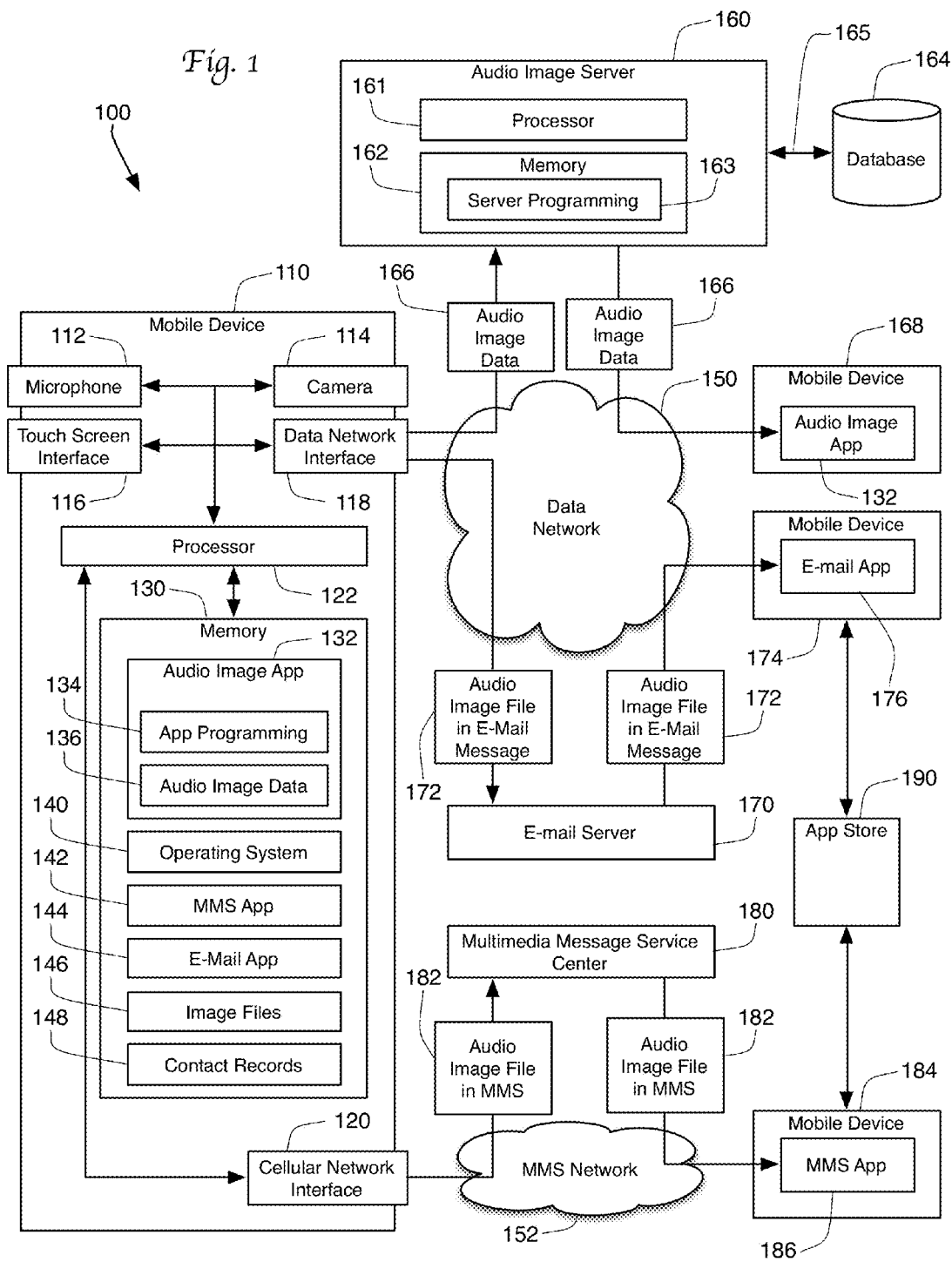
FIG. 1 is a schematic view of a system utilizing the present invention.

FIG. 1 shows a system 100 in which a mobile device 110 can create and transmit audio image files to other users. Audio image files allow users to have a bi-directional, queued, audio communication about a particular visual image or presentation. The mobile device 110 can communicate over a wide area data network 150 with a plurality of computing devices. In FIG. 1, the mobile device 110 communicates over network 150 with an audio image server 160 to send an audio image to mobile device 168, and communicates over the same network 150 with an e-mail server 170 in order to send an e-mail containing an audio image to a second mobile device 174. In one embodiment, the wide area data network is the Internet. The mobile device 110 is also able to communicate with a multimedia messaging service center ("MMS center") 180 over MMS network 152 in order to send an audio image within an MMS message to a third mobile device 184.

The mobile device 110 can take the form of a smart phone or tablet computer. As such, the device 110 will include a microphone 112 and a camera 114 for receiving audio and visual inputs. The device 110 also includes a touch screen user interface 116. In the preferred embodiment, touch screen 116 both presents visual information to the user over the display portion of the touch screen 116 and also receives touch input from the user.

The mobile device 110 communicates over the data network 150 through a data network interface 118. In one embodiment, the data network interface 118 connects the device 110 to a local wireless network that provides connection to the wide area data network 150. The data network interface 118 preferably connects via one of the Institute of Electrical and Electronics Engineers' (IEEE) 802.11 standards. In one embodiment, the local network is based on TCP/IP, and the data network interface 118 utilizes a TCP/IP protocol stack.

Similarly, the mobile device 110 communicates over the MMS network 152 via a cellular network interface 120. In the preferred embodiment, the mobile device 110 sends multi-media messaging service ("MMS") messages via the standards provided by a cellular network 152, meaning that the MMS network 152 used for data messages is the same network 152 that is used by the mobile device 110 to make cellular voice calls. In some embodiments, the provider of the cellular data network also provides an interface to the wide area data network 150, meaning that the MMS or cellular network 152 could be utilized to send e-mail and proprietary messages as well as MMS messages. This means that the actual physical network interface 118, 120 used by the mobile device 110 is relatively unimportant. Consequently, the following description will focus on three types of messaging: e-mail, MMS, and proprietary messaging, without necessarily limiting these messages to a particular network 150, 152 or network interface 118, 120. The use of particular interfaces 118, 120 and networks 150, 152 in this description is merely exemplary.

The mobile device 110 also includes a processor 122 and a memory 130. The processor 120 can be a general purpose CPU, such as those provided by Intel Corporation (Mountain View, Calif.) or Advanced Micro Devices, Inc. (Sunnyvale, Calif.), or a mobile specific processor, such as those designed by ARM Holdings (Cambridge, UK). Mobile devices such as device 110 generally use specific operating systems 140 designed for such devices, such as iOS from Apple Inc. (Cupertino, Calif.) or ANDROID OS from Google Inc. (Menlo Park, Calif.). The operating system 140 is stored on memory 130 and is used by the processor 120 to provide a user interface for the touch screen display 116, handle communications for the device 110, and to manage and provide services to applications (or apps) that are stored in the memory 130. In particular, the mobile device 100 is shown with an audio image app 132, MMS app 142, and an e-mail app 144. The MMS app 142 is responsible for sending, receiving, and managing MMS messages over the MMS network 152. Incoming messages are received from the MMS center 180, which temporarily stores incoming messages until the mobile device 110 is able to receive them. Similarly, the e-mail app 144 sends, receives, and manages e-mail messages with the aid of one or more e-mail servers 170.

The audio image app 132 is responsible for the creation of audio image files, the management of multiple audio image files, and the sending and receiving of audio image files. In one embodiment, the audio image app 132 contains programming instructions 134 for the processor 122 as well as audio image data 136. The image data 136 will include all of the undeleted audio image files that were created and received by the audio image app 132. In the preferred embodiment, the user is able to delete old audio image files that are no longer desired in order to save space in memory 130.

The app programming 134 instructs the processor 122 how to create audio image files. The first step in so doing is either the creation of a new image file using camera 114, or the selection of an existing image file 146 accessible by the mobile device 110. The existing image file 146 may be retrieved from the memory 130 of the mobile device 110, or from a remote data storage service (not shown in FIG. 1) accessible over data network 150. The processor 122 then uses the display 116 to show the image to the user, and allows the user to input an audio commentary using the microphone 112. The app programming 134 instructs the processor 122 how to combine the recorded audio data with the image into an audio image file. In some embodiments, the audio-image file will take the form of a standard video file. In the preferred embodiment, the app programming 134 takes advantage of the ability to link to existing routines in the operating system 140 in order to render this video file. In most cases, these tools take the form of a software development kit (or "SDK") or access to an application programming interface (or "API"). For example, Apple's iOS gives third-party apps access to an SDK to render videos using the H.264 video codec.

After the app programming 134 causes the processor 122 to create the video file (one type of an audio image file), the app programming 134 causes the processor 122 to present a user input screen on display 116 that allows the user to select a recipient of the audio image file. In one embodiment, the user is allowed to select recipients from existing contact records 148 that already exist on the mobile device 110. These same contact records may be used by the MMS app 142 to send MMS messages and the E-mail app 144 to send e-mail messages. In one embodiment, when the user selects a contact as a recipient, the app programming 134 identifies either an e-mail address or a cell phone number for the recipient.

Once the recipient is identified, the app 132 determines whether the audio image file should be sent to the recipient using the audio image server 160 and its proprietary communications channel, or should be sent via e-mail or MMS message. This determination may be based on whether or not the recipient mobile device is utilizing the audio image app 132. A mobile device is considered to be using the audio image app 132 if the app 132 is installed on the device and the user has registered themselves as a user of the app 132 with the audio image server 160. In FIG. 1, mobile device 168 is using the audio image app 132, while mobile devices 174 and 184 are not using the app 132.

To make this determination, the app programming 134 instructs the processor 122 to send a user verification request containing a recipient identifier (such the recipient's e-mail address or cell phone of the recipient, either of which could be considered the recipient's "audio image address") to the audio image server 160. The server 160 is a programmed computing device operating a processor 161 under control of server programming 163 that is stored on the memory 162 of the audio image server 160. The processor 161 is preferably a general purpose CPU of the type provided by Intel Corporation or Advanced Micro Devices, Inc., operating under the control of a general purpose operating system such as Mac OS by Apple, Inc., Windows by Microsoft Corporation (Redmond, Wash.), or Linux (available from a variety of sources under open source licensing restrictions). The server 160 is in further communication with a database 164 that contains information on audio image users, the audio image addresses of the users, and audio image files. The server 160 responds to the user verification request by consulting the database 164 to determine whether each recipient's audio image address is associated in the database 164 with a known user of the app 132. The server 160 then informs the mobile device 110 of its findings.

Although the server 160 is described above as a single computer with a single processor 161, it would be straightforward to implement server 160 as a plurality of separate physical computers operating under common or cooperative programming. Consequently, the terms server, server computer, or server computers should all be viewed as covering situations utilizing one or more than one physical computer.

If the server 160 indicates that the recipient device 168 is associated with a known user of the app 132, then, in one embodiment, the audio image file 166 is transmitted to that mobile device 168 via the server 160. To do so, the mobile device 110 transmits to the server 160 the audio image video file along with metadata that identifies the sender and recipient of the file 166. The server 160 stores this information in database 164, and informs the recipient mobile device 168 that it has received an audio image file 166. If the device 168 is powered on and connected to the data network 150, the audio image file 166 can be immediately transmitted to the mobile device 168, where it is received and managed by the audio image app 132 on that device 168. The audio image app 132 would then inform its user that the audio image file is available for viewing. In the preferred embodiment, the app 132 would list all received audio image files in a queue for selection by the user. When one of the files is selected, the app 132 would present the image and play the most recently added audio commentary made about that image. The app 132 would also give the user of device 168 the ability to record a reply commentary to the image, and then send that reply back to mobile device 110 in the form of a new audio image file. The new audio image file containing the reply comment could also be forwarded to third parties.

If the server 160 indicates that the recipient device 174 or 184 is not associated with a user of the audio image app 132, the mobile device 110 will send the audio image file without using the proprietary communication system provided by the audio image server 160. If the audio image address is an e-mail address, the audio image app 132 on device 110 will create an e-mail message 172 to that address. This e-mail message 172 will contain the audio image file as an attachment, and will be sent to an e-mail server 170 that receives e-mail for the e-mail address used by device 174. This server 170 would then communicate to the device 174 that an e-mail has been received. If the device 174 is powered on and connected to the data network 150, an e-mail app 176 on the mobile device 174 will receive and handle the audio image file within the received e-mail message 172.

Similarly, if the audio image address is a cell phone number, the audio image app 132 will create an MMS message 182 for transmission through the cellular network interface 120. This MMS message 182 will include the audio image file, and will be delivered to an MMS center 180 that receives MMS messages for mobile device 184. If the mobile device 184 is powered on and connected to the MMS network 152, an MMS app 186 on mobile device 184 will download and manage the MMS message 182 containing the audio image file 182. Because the audio image file in either the e-mail message 172 and the MMS message 182 is a standard video file, both mobile devices 174 and 184 can play the file using standard programming that already exists on the devices 174, 184. This will allow the devices 174, 184 to display the image and play the audio commentary concerning the image as input by the user of device 110 without requiring the presence of the audio image app 132. However, without the presence of the app 132, it would not be possible for either device 174, 184 to easily compose a reply audio image message that could be sent back to device 110.

In the preferred embodiment, the e-mail message 172 and the MMS message 182 both contain links to location 190 where the recipient mobile devices 174, 184 can access and download the audio image app 132. The message will also communicate that downloading the app 132 at the link will allow the recipient to create and return an audio reply to this audio image file. The linked-to download location 190 may be an "app store", such as Apple's App Store for iOS devices or Google's Play Store for Android devices. The user of either device 174, 184 can use the provided link to easily download the audio image app 132 from the app store 190. When the downloaded app 132 is initially opened, the users are given the opportunity to register themselves by providing their name, e-mail address(es) and cell phone number(s) to the app 132. The app 132 then shares this information with the audio image server 160, which creates a new user record in database 164. The server 160 can then identify audio image messages that were previously sent to that user and forward those messages to the user. At this point, the user can review the audio image files using the app 132, and now has the ability to create and send a reply audio message as a new audio image file.

In some embodiments, the audio image file is delivered as a video file to e-mail recipients and MMS recipients, but is delivered as separate data elements to mobile devices 168 that utilize the audio image app 132. In other words, a single video file is delivered via an e-mail or MMS attachment, while separate data elements are delivered to the mobile devices 168 that use the audio image app 132. In these cases, the "audio image file" delivered to the mobile device 168 would include an image file compressed using a still-image codec (such as JPG, PNG, or GIF), one or more audio files compressed using an audio codec (such as MP3 or AAC), and metadata identifying the creator, creation time, and duration of each of the audio files. The audio image app 132 would then be responsible for presenting these separate data elements as a unified whole. As explained below, the audio image file 166 may further include a plurality of still images, one or more video segments, metadata identifying the order and timing of presentations of the different visual elements, or metadata defining augmentations that may be made during the presentation of the audio image file.

In sending the MMS message 182, the mobile device 130 may take advantage of the capabilities of the separate MMS app 144 residing on the mobile device 110. Such capabilities could be accessed through an API or SDK provided by the app 144, which is described in more detail below. Alternatively, the audio image app programming 134 could contain all of the programming necessary to send the MMS message 182 without requiring the presence of a dedicated MMS app 142. Similarly, the mobile device 130 could use the capabilities of a separate e-mail app 144 to handle the transmission of the e-mail message 172 to mobile device 174, or could incorporate the necessary SMTP programming into the programming 134 of the audio image app 132 itself.

Database 164

Figure 2:
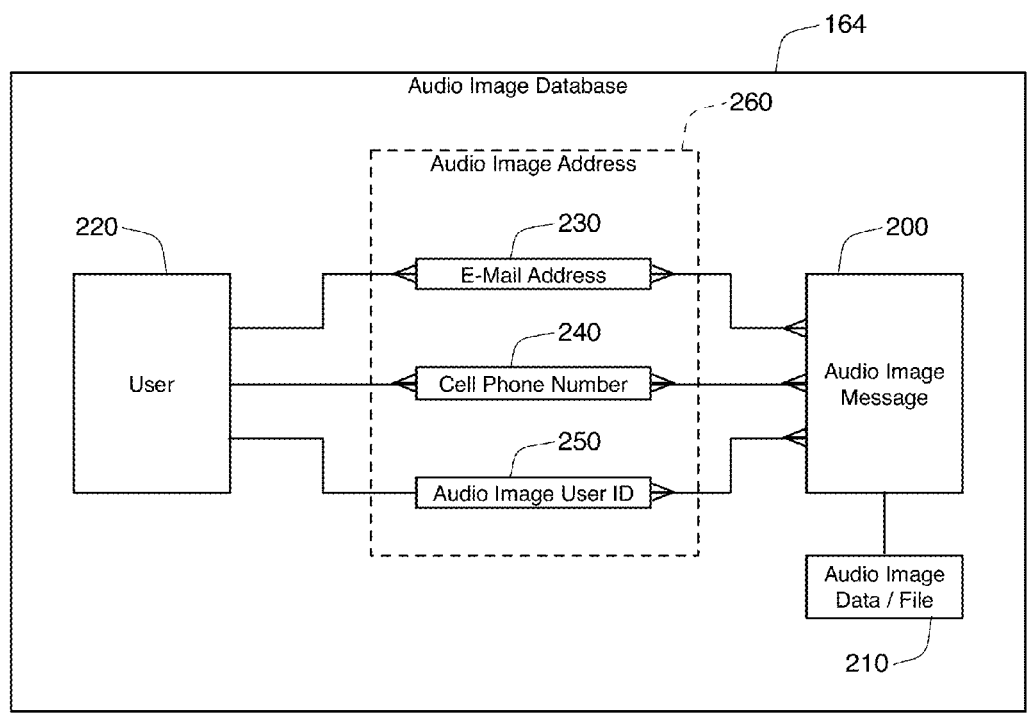
FIG. 2 is a schematic diagram showing a database accessed by a server used in the system of FIG. 1.

FIG. 2 shows one embodiment of database 164 that is used to track users and audio image messages. The database 164 may be stored in the memory 162 of the audio image server 160, or it may be stored in external memory accessible to the server 160 through a bus or network 165. The database 164 is preferably organized as structured data, such as separate tables in a relational database or as database objects in an object-oriented database environment. Database programming 163 stored on the memory 162 of the audio image server 160 directs the processor 161 to access, manipulate, update, and report on the data in the database 164. FIG. 2 shows the database 164 with tables or objects for audio image messages 200, audio image data or files 210, users 220, e-mail addresses 230, cell phone numbers 240, and audio image user IDs 250. Since e-mail addresses 230, cell phone numbers 240, and audio image user IDs 250 can all be used as a recipient or sender address for an audio image message 200, FIG. 2 shows a dotted box 260 around these database entities 230, 240, 250 so that this description can refer to any of these address types as an audio image address 260. These addresses 260 can all be considered electronic delivery addresses, as the addresses 260 each can be used to deliver an electronic communication to a destination.

Relationships between the database entities are represented in FIG. 2 using crow's foot notation. For example, FIG. 2 shows that each user database entity 220 can be associated with a plurality of e-mail address 230 and cell phone numbers 240, but with only a single audio image user ID 250. Meanwhile, each e-mail address 230, cell phone number 240, and audio image user ID 250 (i.e., each audio image address 260) is associated with only a single user entity 220. Similarly, each audio image message 200 can be associated with a plurality of audio image addresses 260 (e-mail addresses 230, cell phone numbers 240, and audio image user IDs 250), which implies that a single message 200 can have multiple recipients. In the preferred embodiment, the audio image message 200 is also associated with a single audio image address 260 to indicate the sender of the audio image message 200. The fact that each audio image address 260 can be associated with multiple audio image messages 200 indicates that a single audio image address 260 can be the recipient or sender for multiple messages 200. FIG. 2 also shows that each audio image message database entity 200 is associated directly with an audio image file 210. This audio image file 210 can be a single video file created by the audio image app 132, or can be separate image and audio files along with metadata describing these files. The distinctions between these database entities 200-250 are exemplary and do not need to be maintained to implement the present invention. For example, it would be possible for the audio image message 200 to incorporate the audio image data or files 210 in a single database entity. Similarly, each of the audio image addresses 260 could be structured as part of the user database entity 220. The separate entities shown in FIG. 2 are presented to assist in understanding the data that is maintained in database 164 and the relationships between that data.

Associations or relationships between the database entities shown in FIG. 2 can be implemented through a variety of known database techniques, such as through the use of foreign key fields and associative tables in a relational database model. In FIG. 2, associations are shown directly between two database entities, but entities can also be associated through a third database entity. For example, a user database entity 200 is directly associated with one or more audio image addresses 260, and through that relationship the user entity 200 is also associated with audio image messages 200. These relationships can also be used to indicate different roles. For instance, an audio image message 200 may be related to two different audio image user IDs 250, one in the role of a recipient and one in the role as the sender.

Audio Image File 300

Figure 3:
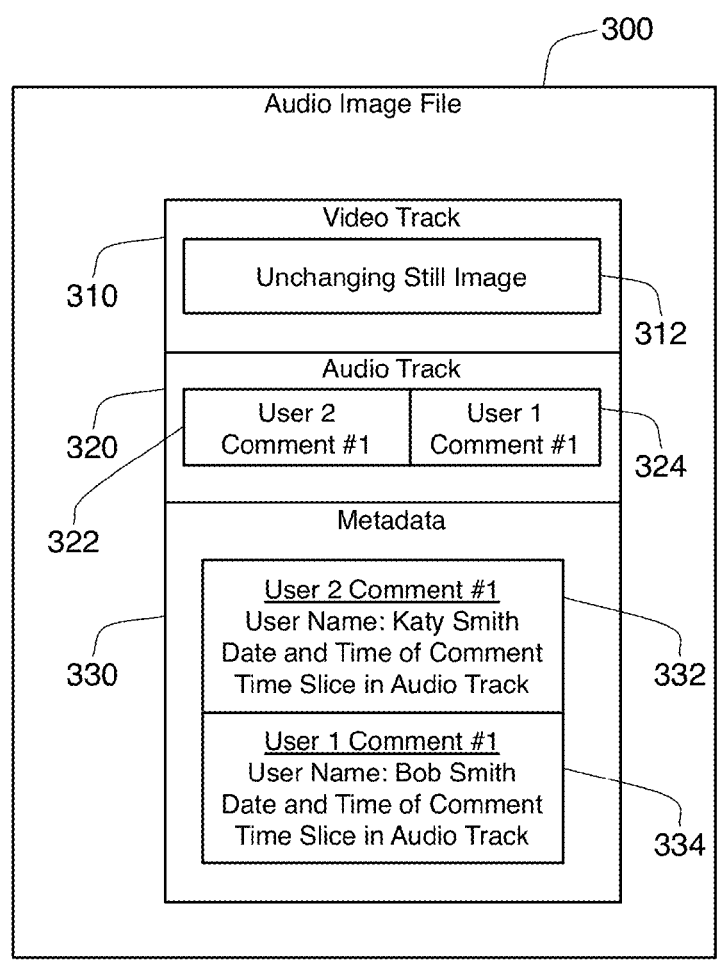
FIG. 3 is a schematic diagram showing the components of an audio image file.

An example audio image file 300 is shown in FIG. 3. In this example, the audio image file 300 is a video file containing a video track 310, an audio track 320, and metadata 330. The video track contains a single, unchanging still image 312 that is compressed using a known video codec. When the H.264 codec is used, for example, the applicable compression algorithms will ensure that the size of the video track 310 will not increase proportionally with the length of the audio track, as an unchanging video track is greatly compressed using this codec. While the H.264 codec does use keyframes that contain the complete video image, intermediate frames contain data only related to changes in the video signal. With an unchanging video feed, the intermediate frames do not need to reflect any changes. By increasing the time between keyframes, even greater compression of the video track 310 is possible.

In the audio image file 300 shown in FIG. 3, the audio track contains two separate audio comments 322, 324. In FIG. 3, the first comment 322 to appear in the track 320 is actually the second to be recorded chronologically. This means that the audio track 320 of the audio image file 300 will start with the most recent comment 322. When a standard video player plays this audio image file 300, the most recently added comment will be played first. This could be advantageous if multiple comments 322, 324 have been added to the audio image file 300 and the recipient is only interested in hearing the most recently added comments 322, 324. Alternatively, the audio commentaries 322, 324 could be added to the audio image file 300 in standard chronological order so that the first comment recorded 324 will start the audio track 320. This allows a user who views the audio image file 300 with a standard video player to hear all the comments 324, 322 in the order in which they were recorded. This may be the preferred implementation, as later-recorded commentaries will likely respond to statements made in the earlier comments.

The metadata 330 that is included in the video file 300 provides information about these two audio commentaries 322, 324. Metadata 332 contains information about the first comment 322, including the name of the user who recorded the comment (Katy Smith), the data and time at which Ms. Smith recorded this comment, and the time slice in the audio track 320 at which this comment 322 can be found. Similarly, metadata 334 provides the user name (Bob Smith), date and time of recording, and the time slice in the audio track 320 for the second user comment 324. The metadata 330 may also contain additional data about the audio image file 300, as the audio image file 300 is itself a video file and the video codec and the audio image app 132 that created this file 300 may have stored additional information about the file 300 in metadata 330.

In the preferred embodiment, the different comments 322, 324 are included in a single audio track 320 without chapter breaks. Chapter breaks are normally used to divide video files into logical breaks, like chapters in a book. The video playback facilities in some standard mobile device operating systems are not capable of displaying and managing chapter breaks, and similarly are not able to separately play different audio tracks in a video file. As a result, the audio image file 300 shown in FIG. 3. 300 does not use separate chapters or separate audio tracks to differentiate between different user comments 322, 324. Rather, the metadata 330 is solely responsible for identifying the different comments 322, 324 in the audio track 320 of the file 300. In FIG. 3, this is done through the "time slice" data, which indicates the start and stop time (or start time and duration) of each comment in the track 320. In other embodiments, true video file chapter breaks (or even multiple tracks) could be used to differentiate between different audio comments 322, 324.

Figure 4:
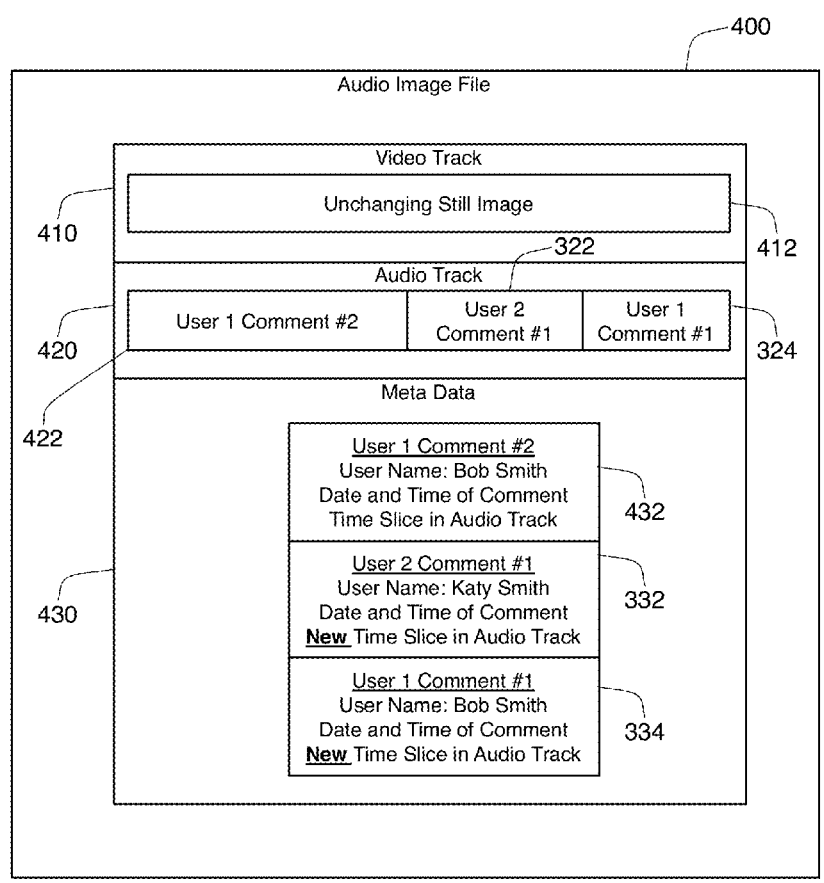
FIG. 4 is a schematic diagram showing the components of a new audio image file after an audio comment is added to the audio image file of FIG. 3.

FIG. 4 shows a new audio image file 400 that is created after a third comment 422 is added to the file 300 shown in FIG. 3. As was the case with file 300, this file 400 includes a video track 410, an audio track 420, and metadata 430. The audio track 420 includes a third comment 422 in addition to the two comments 322, 324 that were found in file 300. In FIG. 4, this new comment 422 appears at the beginning of the audio track 420, as this comment 422 is the most recent comment in this audio image file 400. Similarly, the metadata 430 includes metadata 432 concerning this new track 422, in addition to the metadata 332, 334 for the prior two tracks 322, 324, respectively. Note that the time slice location of the prior two tracks 322, 324 has changed in the new audio track 420. While track 322 originally appeared at the beginning of track 320, it now appears in track 420 after the whole of track 422. Consequently, the new location of audio comments 322, 324 must now be reflected in revised versions of metadata 332, 334, respectively. In the alternative embodiment where the commentaries are recorded in the audio track 420 in chronological order, the new commentary 422 would appear after commentary 324 and commentary 322 in the audio track 420. Furthermore, in this embodiment it would not be necessary to modify metadata 332 and 334 as the time locations for these commentaries 322, 324 in track 420 would not have changed with the addition of the new commentary 422. With both embodiments, the video track 410 will again include an unchanging still image 412, much like the video track 310 of file 300. The one difference is that this video track 410 must extend for the duration of all three comments 322, 324, and 422 in the audio track 420.

User Interfaces 510, 610

Figure 5:
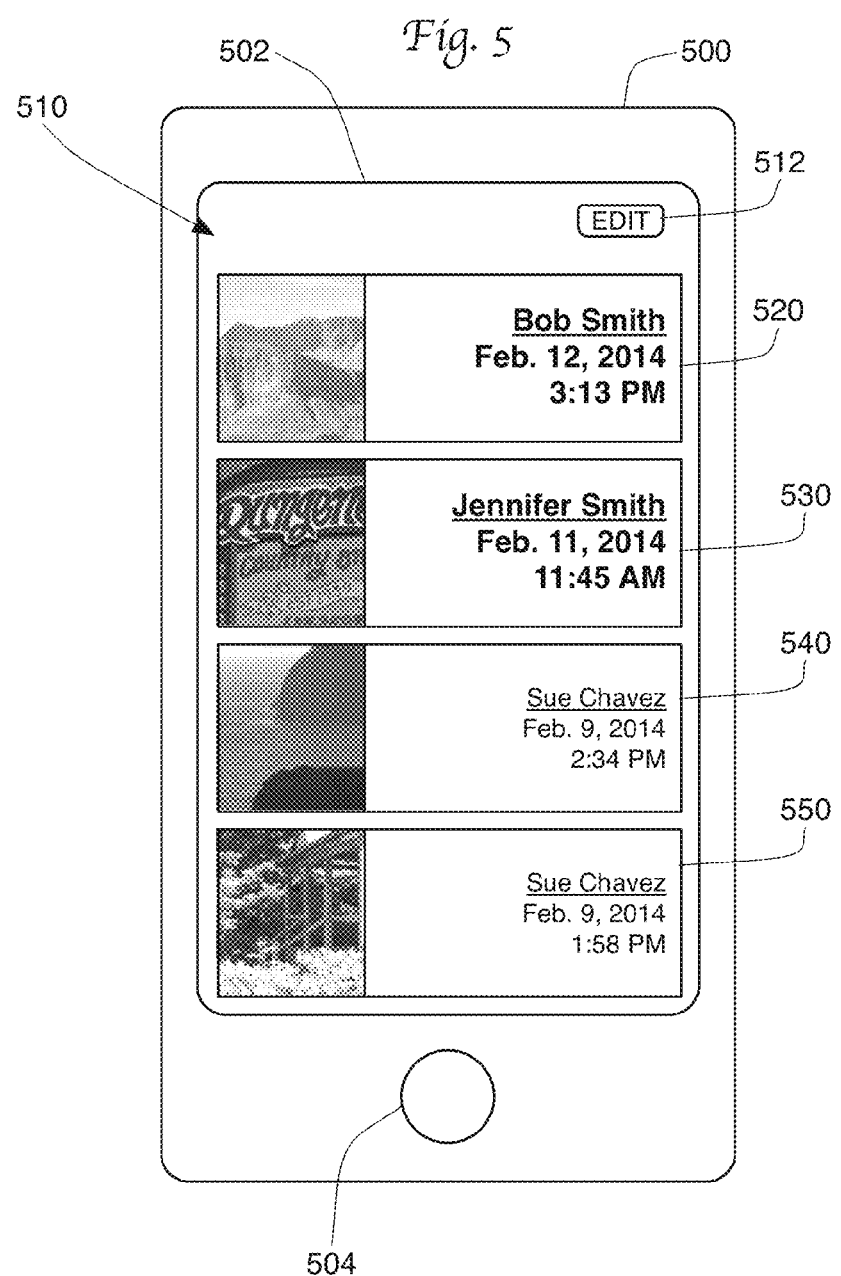
FIG. 5 is a plan view of a mobile device displaying a user interface provided by an app.

FIG. 5 shows a mobile device 500 that has a touch screen display 502 and a user input button 504 located below the display 502. In this Figure, the device 500 is presenting a user interface 510 created by the audio image app 132. This interface 510 shows a plurality of audio images 520-550 that have been received by the app 132 from the server 160. The audio images 520-550 are presented in a list form, with each item in the list showing a thumbnail graphic from the audio image and the name of an individual associated with the audio image 520-550. In some circumstances, the name listed in interface 510 is the name of the individual that last commented on the audio image 520-550. In other circumstances, the user who owns the mobile device 500 may have made the last comment. In these circumstances, the name listed may be the other party (or parties) who are participating in the audio commentary concerning the displayed image. The list in interface 510 also shows the date and time of the last comment added to each audio image. In FIG. 5, the first two audio images 520, 530 are emphasized (such as by using a larger and bold type font) to indicate to the user that these audio images 520, 530 have not yet been viewed. The interface 510 may also include an edit button 512 that allows the user to select audio images 520-550 for deletion.

In FIG. 5, the audio images 520-550 are presented in a queue in reverse chronological order, with the most recently received audio image 520 being presented at the top. In other embodiments, the audio images 520-550 are presented in a hierarchical in-box. At the top of the hierarchy are participants—the party or parties on the other side of a conversation with the user. After selection of a participant, the in-box presents audio images associated with that participant as the next level in the hierarchy. These audio images are preferably presented in reverse chronological order, but this could be altered to suit user preferences. After selection of an individual audio image, the in-box may then present the separate commentaries made in that audio image as the lowest level of the hierarchy. A user would then directly select a particular audio commentary for viewing in the app. Alternatively, the app could present the latest audio commentary to the user after the user selected a particular audio image without presenting the separate commentaries for individual selection.

Figure 6:
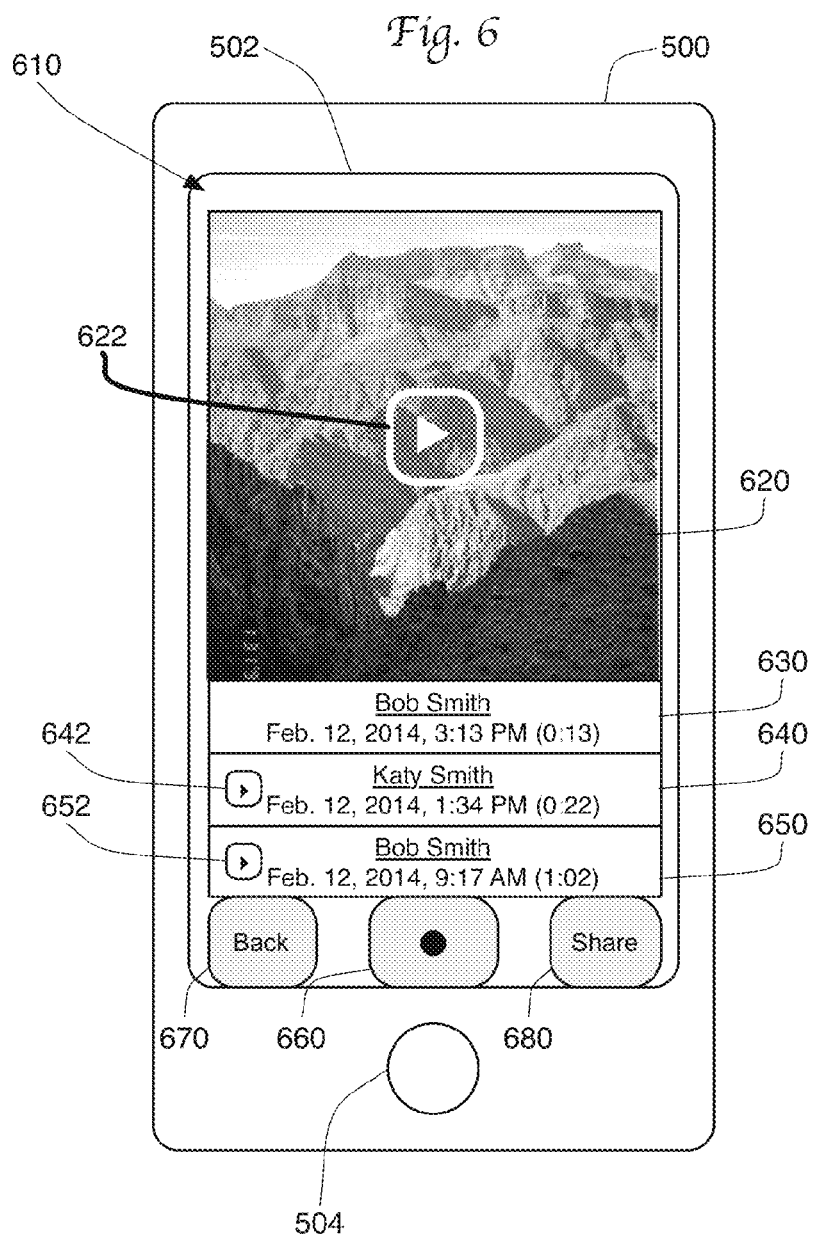
FIG. 6 is a plan view of the mobile device of FIG. 5 displaying a second user interface provided by the app.

If a user selects the first audio image 520 from interface 510, a new interface 610 is presented to the user, as shown in FIG. 6. This interface includes a larger version of the image 620 included in the audio image file. Superimposed on this image 620 is a play button 622, which, if pressed, will play the last audio commentary that has been added to his audio image. Below the image 620 is a list of the audio commentaries 630, 640, 650 that are included with the audio image. As seen in FIG. 6, the most recent audio commentary was created by Bob Smith on Feb. 12, 2014 at 3:13 PM, and has a duration of 0 minutes and 13 seconds. If the user selects the play button 622 (or anywhere else on the image 620), this audio commentary will be played. If the user wishes to select one of the earlier audio commentaries 640, 650 for playback, they can select the smaller playback buttons 642, 652, respectively. If more audio commentaries exist for an image 620 than can be simultaneously displayed on interface 610, a scrollable list is presented to the user.

In the preferred embodiment, the user interface 610 will remove the listings 630, 640, 650 from the display 502 when an audio commentary is being played. The image 620 will expand to cover the area of the display 502 that previously contained this list. This allows the user to focus only on the image 620 when hearing the selected audio commentary. When the user has finished listening to the audio commentary, they can press and hold the record button 660 on screen 502 to record their own response. In the preferred embodiment, the user holds the button 660 down throughout the entire audio recording process. When the button 660 is released, the audio recorded is paused. The button 660 could be pressed and held again to continue recording the user's audio commentary. When the button 660 is released, the user is presented with the ability to listen to their recording, re-record their audio commentary, delete their audio commentary, or send a new audio image that includes the newly recorded audio commentary to the sender (in this case Bob Smith) or to a third party. By pressing the back button 670, the user will return to interface 510. By pressing the share button 680 without recording a new commentary, the mobile device 500 will allow a user to share the selected audio commentary 520 as it was received by the device 500.

Methods 700, 800, 900

Figure 7:
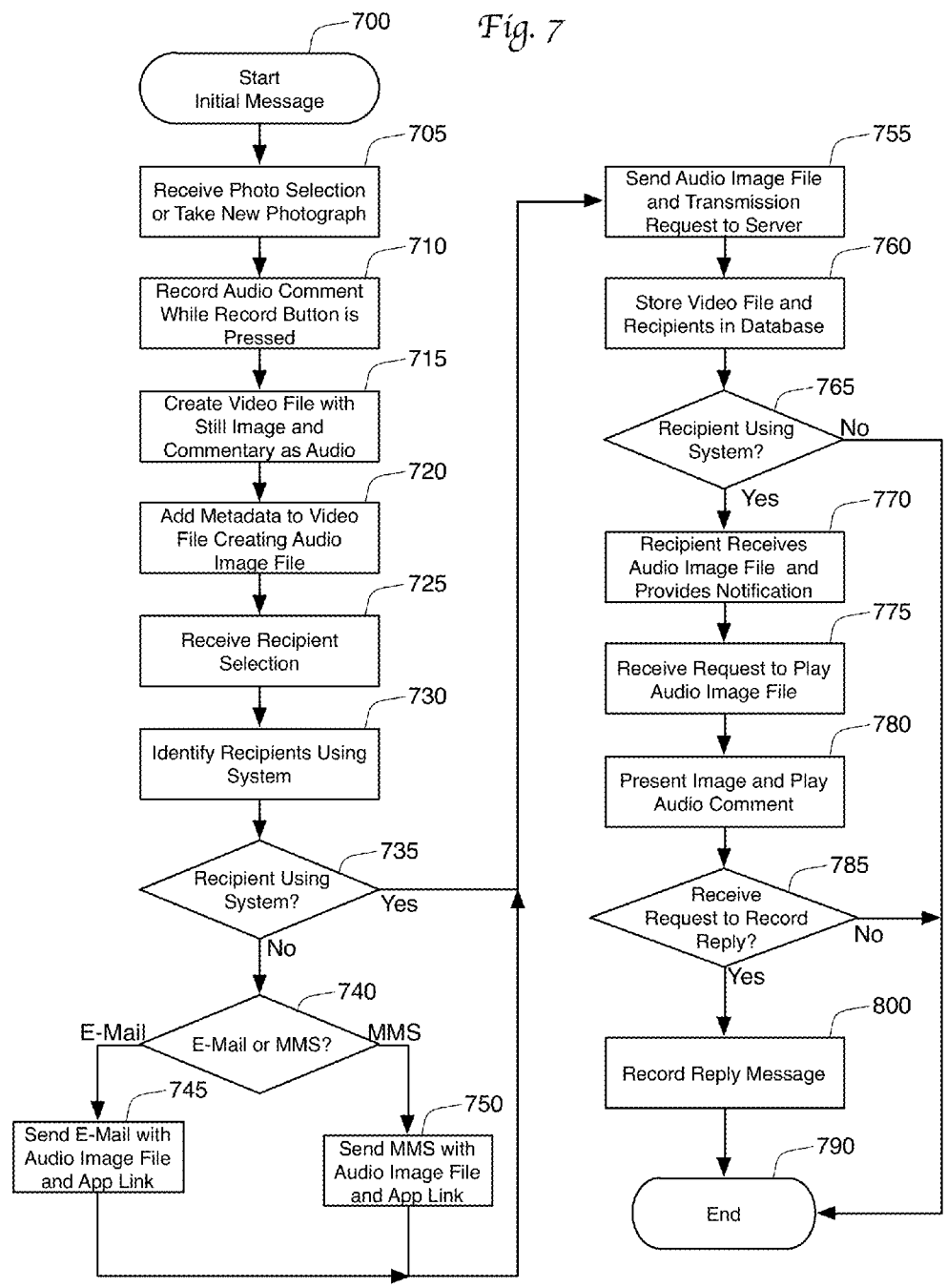
FIG. 7 is a flow chart showing a method of creating, transmitting, and responding to an audio image file.

The flowchart in FIG. 7 shows a method 700 for creating, sending, and playing an audio image file. This method 700 will be described from the point of view of the system 100 shown in FIG. 1. The method begins at step 705, when the originator of an audio image either selects an image from the existing photos 146 already on their mobile device 110, or creates a new image using camera 114. At step 710, the app 132 shows the selected image to the user and allows the user to record an audio commentary, such as by holding down a record button (similar to button 660) presented on the touch screen 116 of the mobile device 110. The app 132 will then use a video codec, such as may be provided by the mobile device operating system 140, to encode both the image and the audio commentary into a video file (step 715). The app 132 will also add metadata 330 to the video file to create an audio image file 300 at step 720. The metadata 330 provides sufficient information about the audio track 320 of the audio image file 300 to allow another device operating the app 132 to correctly play the recorded audio commentary.

Once the audio image file 300 is created, the app 132 will, at step 725, present a user interface to allow the originator to select a recipient (or multiple recipients) for this file 300. As explained above, the app 132 may present the user with their existing contact list 148 to make it easier to select a recipient. In some cases, a recipient may have multiple possible audio image addresses 260 at which they can receive the audio image file 300. For instance, a user may have two e-mail addresses 230 and two cellular telephone numbers 240. In these cases, the app 132 can either request that the originator select a single audio image address for the recipient, or the app can select a "best" address for that user. The best address can be based on a variety of criteria, including which address has previously been used to successfully send an audio image file to that recipient in the past.

Once the recipient is selected, the app 132 will determine at step 730 whether or not the recipient is a user of the app 132. As explained above, this can be accomplished by the app 132 sending a query to the audio image server 160 requesting a determination as to whether the audio image address for that recipient is associated with a known user of the app 132. If the recipient has multiple possible audio image addresses, the query may send all of these addresses to the server 160 for evaluation. If the recipient is not a known user of the app 132, this will be determined at step 735. Step 740 will then determine whether the selected or best audio image address is an e-mail address or a cell phone number. If it is an e-mail address, step 745 will create and send an e-mail 172 to the recipient. This e-mail 172 will include the audio image file 300 as an attachment to the e-mail. In addition, the e-mail will include a link to the download location 190 for the app 132 along with a message indicating that the app 132 is needed to create and send a reply to the audio image. If step 740 determines that the audio image address 260 is a cell phone number, then step 750 will create and send an MMS message 182 to the recipient. As was true of the e-mail 172, the MMS message 182 will include the audio image file as an attachment, and will include a link to download location 190 along with a message stating that the app 132 is necessary to create a reply to the audio image.

After sending an e-mail at step 745 or an MMS message at step 750, step 755 will also send the audio image file and relevant transmission information to the audio image server 160. This transmission information may include the time of the e-mail or MMS transmission, the time that the audio comment was generated, the name of the originator and the recipient, and the recipient's chosen audio image address. This information will then be stored in database 164 along with the audio image file itself (step 760). As shown in FIG. 7, these same steps 755, 760 will also occur if step 735 determined that the recipient was a user of the app 132, as the server 160 needs this information to complete the transmission to the recipient. In fact, since the server 160 always receives this information from the sending mobile device 110 regardless of the transmission type, it is possible to eliminate the separate query of step 730. In this alternative embodiment, the transmission of the information at step 755 would occur at step 730. The app 132 could then be informed if the recipient were not a user of the app 132, allowing steps 740-750 to proceed. If the app 132 on mobile device 110 instead received notification that the server 160 was able to transmit the information directly to the recipient, then no additional actions would be required on behalf of the sending mobile device 110.

Once the server 160 has received the transmission information at step 755 and stored this information in database 164 at step 760, step 765 considers whether the recipient is a user of the app 132. If not, the server 160 need not take any further action, as the sending mobile device 110 is responsible for sending the audio image file to the recipient. In this case, the method 700 will then end at step 790 (method 900 shown in FIG. 9 describes the receipt of an audio image file by a mobile device that does not use the app).

Assuming that the recipient is using the app 132, then the server 160 transmits the audio image file 300 to the recipient mobile device 168. The recipient device 168 receives the audio image file 300 at step 770, and then provides a notification to the user than the file 300 was received. The notification is preferably provided using the notification features built into the operating systems of most mobile devices 168. At step 775, the app 132 is launched and the user requests the app 132 to present the audio image file 300. At step 780, the image is then displayed on the screen and this audio commentary is played. At this time, the user may request to record a reply message. If step 785 determines that the user did not desire to record a reply, the method 700 ends at step 790. If a reply message is desired, then method 800 is performed.

Figure 8:
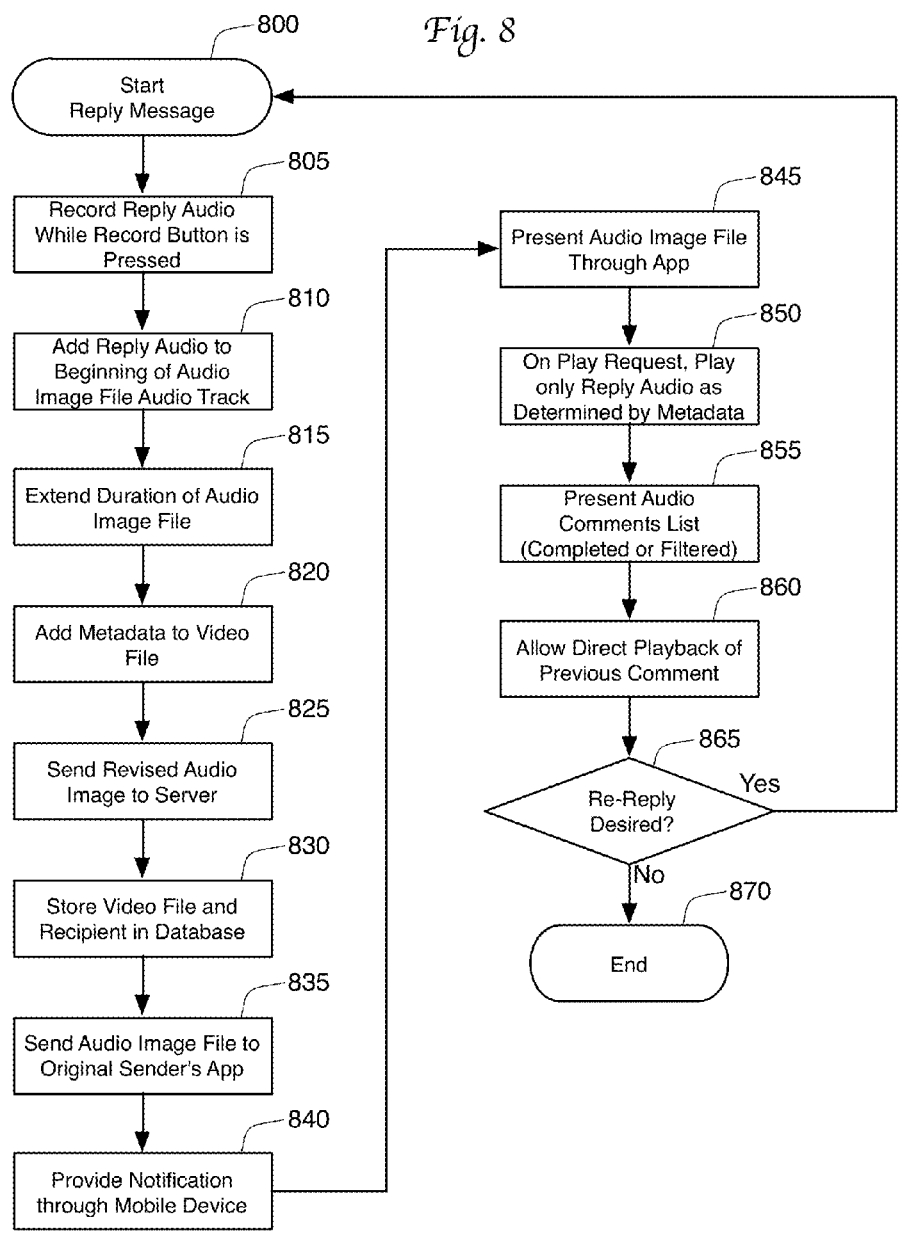
FIG. 8 is a flow chart showing the detailed steps of responding to an audio image file.

Method 800 is presented in the flow chart found in FIG. 8. The method starts at step 805 with the user of mobile device 168 indicating that they wish to record a reply. In the embodiments described above, this is accomplished by holding down a record button 660 during or after viewing the video image file 300. When the user lets go of the record button 660, the audio recording stops. At step 810, the audio recording is added to the beginning of the audio track 320 of the audio image file 300. With some audio codecs, the combining of two or more audio commentaries into a single audio track 320 can be accomplished by simply merging the two files without the need to re-compress the relevant audio. Other codecs may require other techniques, which are known to those who are of skill in the art. At step 815, the video track 310 is extended to cover the duration of all of the audio commentaries in the audio track 320. Finally, at step 820 metadata is added to the new audio image file. This metadata will name the reply commentator, and will include information about the time and duration of the new comment. This metadata must also reflect the new locations in the audio track for all pre-existing audio comments, as these comments might now appear later in the new audio image file.

At step 825, mobile device 168 sends the new audio image file to the server 160 for transmission to the originating device 110. Note that the transmission of a reply to the originating device 110 may be assumed by the app 132, but in most cases this assumption can be overcome by user input. For instance, the recipient using mobile device 168 may wish to record a commentary and then send the new audio image file to a mutual friend, or to both the originator and mutual friend. In this case, the workflow would transition to step 730 described above. For the purpose of describing method 800, it will be assumed that only a reply to the originating device 110 is desired.

The server will then store the new audio image file and the transmission information in its database 164 (step 830), and then transmit this new file to the originating mobile device 110 (step 835). App 132 will then notify the user through the touch screen interface 116 that a new audio image has been received at step 840. When the app 132 is opened, the app 132 might present all of the user's audio image files in a list, such as that described in connection with FIG. 5 (step 845). If the user request that the app 132 play the revised audio image file, the app 132 will display the original image and then play back the reply audio message at step 850. The metadata 330 in the file 300 will indicate when the reply message ends, allowing the app 132 to stop playback before that portion of the video file containing the original message is reached. As indicated at step 855, the app 132 can also present to the user a complete list of audio comments that are found in this audio image file 300, such as through interface 610 shown in FIG. 6.

In some cases, an audio image file may contain numerous comments. To assist with the management of comments, the app 132 can be designed to allow a user to filter the audio comments so that not all comments are displayed and presented on interface 610. For instance, a user may wish to only know about comments made by friends that are found in their contact records 148 or are made by the individual who sent the message to the user. In this instance, interface 610 would display only the comments that the user desired. The interface 610 may also provide a technique for the user to reveal the hidden comments. The user is allowed to select any of the displayed comments in the list for playback. The app 132 would then use the metadata 330 associated with that comment to play back only the relevant portion of the audio track 320 (step 860). The originator would also have the ability to create their own reply message at step 865. If such a re-reply is desired, the method 800 would start again. If not, the method 800 ends at step 870.

Figure 9:
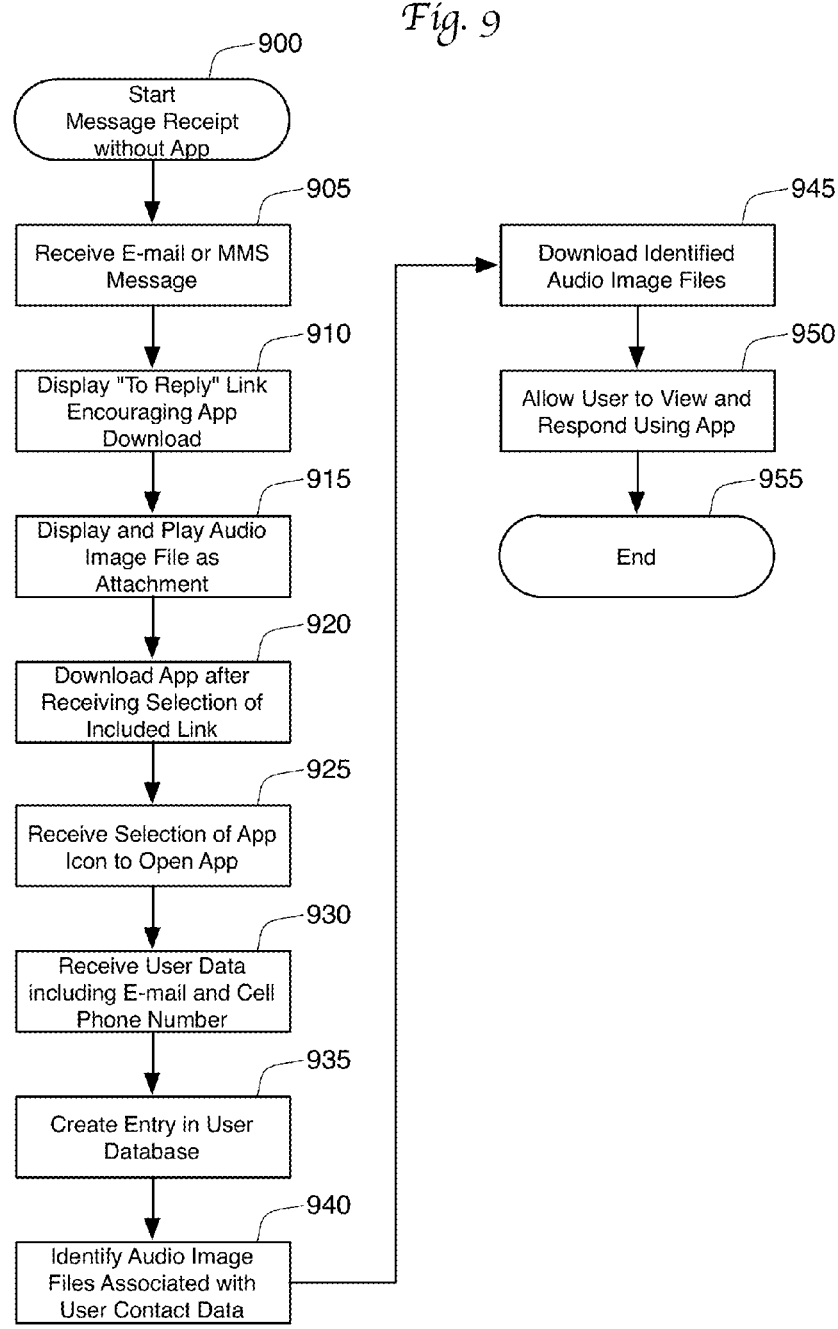
FIG. 9 is a flow chart showing the method of receiving an audio image file without the initial use of an app.

FIG. 9 displays a flow chart describing the method 900 by which a non-user of the app 132 is able to download the app 132 and see previously transmitted messages. The method 900 begins at step 905 when the user receives an e-mail or an MMS message containing an audio image file 300. When the e-mail or MMS message is opened, it will display a message indicating that the app 132 is required to create a reply (step 910). The message will also include a link to the app 132 at an app store 190, making the download of the app 132 as simple as possible.

Since the audio image file 300 that is sent in this context is a video file, the user can play the audio image file as a standard video file at step 915. This would allow the user to view the image and hear the audio commentaries made about the image. If more than one audio commentary were included in the audio image file 300, a standard video player would play through all of the commentaries without stopping. Whether the commentaries would play in chronological order or in reverse chronological order will depend completely on the order in which the commentaries were positioned in the audio track, as described above in connection with FIGS. 3 and 4. When a standard video player is used to play the audio image file 300, the user will not be able to add a new audio commentary to this file 300.

If the user wishes to create a new comment, they will select the provided link to app store 190. This selection will trigger the downloading of the app 132 at step 920. When the user initiates the app 132 by selecting the app's icon in the app selection screen of the operating system at step 925, the app 132 will request that the user enter personal information into the app. In particular, the app 132 will request that the user provide their name, their e-mail address(es), and their cell phone number(s). This information is received by the app 132 at step 930, and then transmitted to the server 160. The server 160 will then create a new user record 220 in the database 164, give that record 220 a new User ID 250, and then associate that user record 220 with the user provided e-mail addresses 230 and cell phone numbers 240 (step 935).

At step 940, the server 160 will search the database for audio image messages 200 that have been previously sent to one of the e-mail addresses 230 or cell phone numbers 240 associated with the new user record 220. All messages 200 so identified will be downloaded, along with the actual audio image file or data 210, to the user's app 132 at step 945. The user can then view the downloaded audio image files (such as through user interface 510 of FIG. 5), select one of the audio image files (as shown in FIG. 6), and then view the audio image file 300 through the app 132 (step 950). Step 950 will also allow the user to create reply audio messages through method 800, and transmit the resulting new audio image files to other users. The process 900 then terminates at step 955.

Deletion of Audio Image Files

As described above, the database 164 is designed to receive a copy of all audio image data files 300 that are transmitted using system 100. In addition, app 132 may store a copy of all audio image data files 300 that are transmitted or received at a mobile device 110. In the preferred embodiment, the app 132 is able to selectively delete local copies of the audio image data files 300, such as by using edit button 512 described above. To the extent that the same data is stored as database entity 210 in the database 164 managed by server 160, it is possible to allow an app 132 to undelete an audio image file 300 by simply re-downloading the file from the server 160. If this were allowed, the server might require the user to re-authenticate themselves, such as by providing a password, before allowing a download of a previously deleted audio image file.

In some embodiments, the server 160 will retain a copy of the audio image file 300 as data entity 210 only as long as necessary to ensure delivery of the audio image. If all recipients of an audio image file 300 were users of the app 132 and had successfully downloaded the audio image file 300, this embodiment would then delete the audio image data 210 from the database 164. Meta information about the audio image could still be maintained in database entity 200. This would allow the manager of server 160 to maintain information about all transmissions using system 100 while ensuring users that the actual messages are deleted after the transmission is complete. If some or all of the recipients are not users of the app 132, the server 160 will keep the audio image data 210 to allow later downloads when the recipients do become users of the app 132. The storage of these audio image files in database 164 can be time limited. For example, one embodiment may require deletion of all audio image data 210 within three months after the original transmission of the audio image file even if the recipient has not become a user of the app 132.

Visual Element Enhancements—Gestures, Arrows, and Labels

Figure 10:
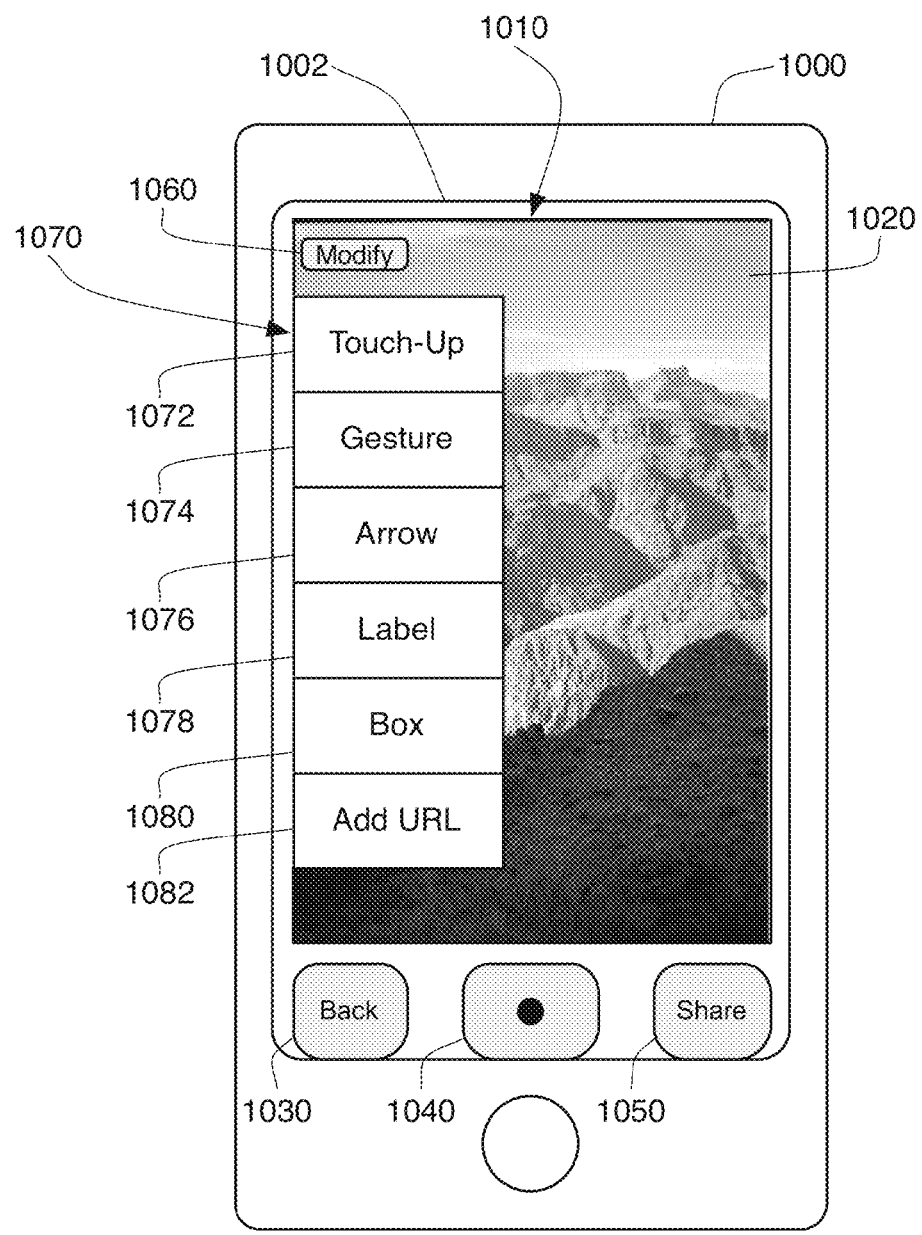
FIG. 10 is a plan view of the mobile device of FIG. 5 showing a menu for augmenting an audio image file.

FIG. 10 shows a mobile device 1000 that has a touch screen display 1002 containing an audio-image creation user interface 1010. The interface 1010 is similar to interface 610 above, in that the interface 1010 displays a large version of the image 1020 that is the subject of the audio-image commentary, and also includes images of control buttons 1030, 1040, and 1050. In addition, interface 1010 includes a modify button 1060, which allows the creator of an audio image commentary to make enhancements to the image 1020. When the user presses this button 1060, a modify menu appears 1070 presenting a list of options for modifying the image 1020. In other embodiments, the modify menu 1070 may appear upon the pressing of a menu icon or after inputting a swiping movement on the touchscreen rather than upon pressing of a "Modify" button. The options presented in the modify menu 1070 include applying touch-up editing 1072 to the image 1020, adding one or more gestures 1074, adding an arrow 1076 or label 1078, adding a zoom or crop box 1080, and adding a uniform resource location (or URL) 1082. The touch-up editing option 1072 allows the user to color-enhance, de-colorize, or otherwise alter the image 1020 in a manner that is well known in the art of photography editing, and therefore will not be discussed in any further detail herein.

Figure 11:
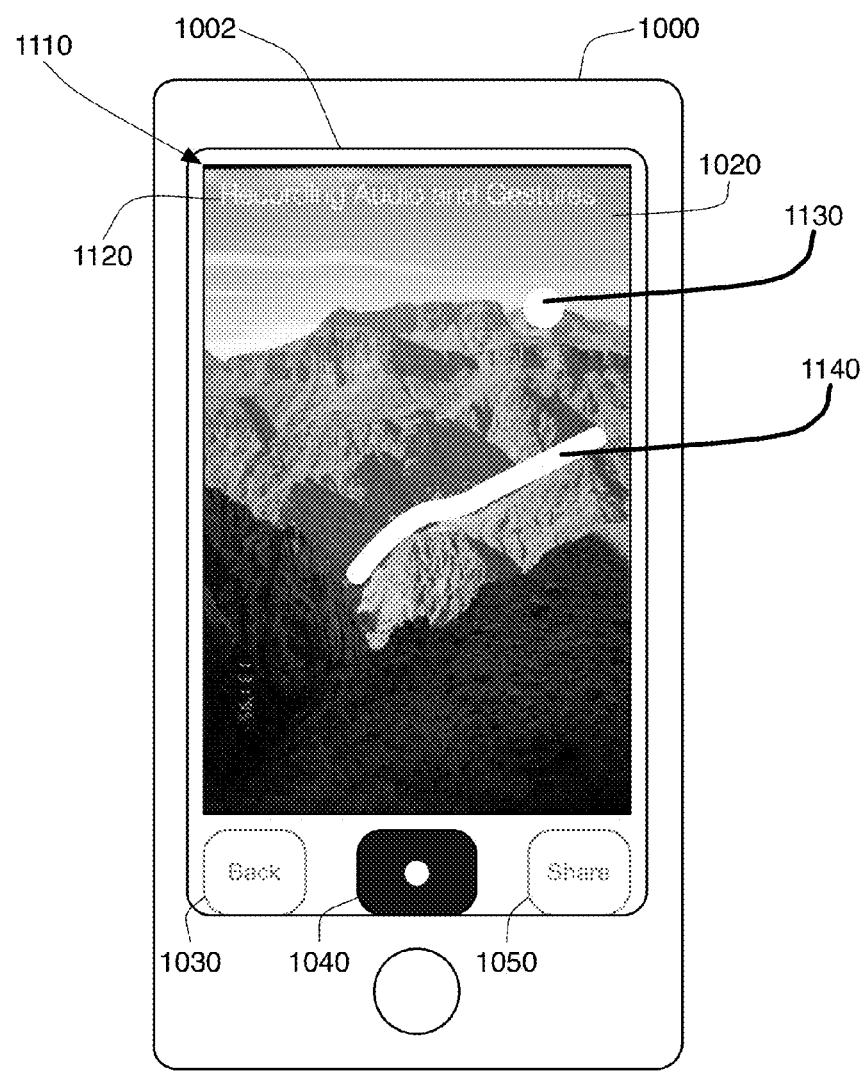
FIG. 11 is a plan view of the mobile device of FIG. 5 showing the recording of gestures on the user interface.

If the user has selected menu item 1074, the mobile device 1000 will display the gestures interface 1110 as shown in FIG. 11. In this context, gestures are interactions made by the user interacting with the image 1020, such as by touching a particular location on the image 1020 or dragging their finger in a path across the image 1020. In the preferred embodiment, the user is allowed to add gestures to the photograph 1020 while recording an audio commentary about the image 1020. In this case, it is not necessary for the user to hold the record button 1040 during the entire time they record their audio. Rather, button 1040 is pressed to begin recording and pressed again to end recording. During this recording time, the audio-image app records the audio while also recording the location and timing of each gesture. In one embodiment, the display 1002 provides a visual reminder 1120 to the user that the mobile device 1000 is recording an audio commentary and recording gestures.

In FIG. 11, the user has touched the image 1020 at location 1130 while recording their audio commentary, and has also dragged also their finger across path 1140. The timing of each gesture with respect to the audio commentary is an important aspect of recording the gestures. For example, the user may say that "we are intending to leave the canyon at this location" while pressing at location 1130, and then add that "we believe that trail takes us along this portion of the canyon" while creating path 1140. When the user has completed adding gestures and audio commentary to the image 1020, the user re-presses the record button 1040.

Figure 12:
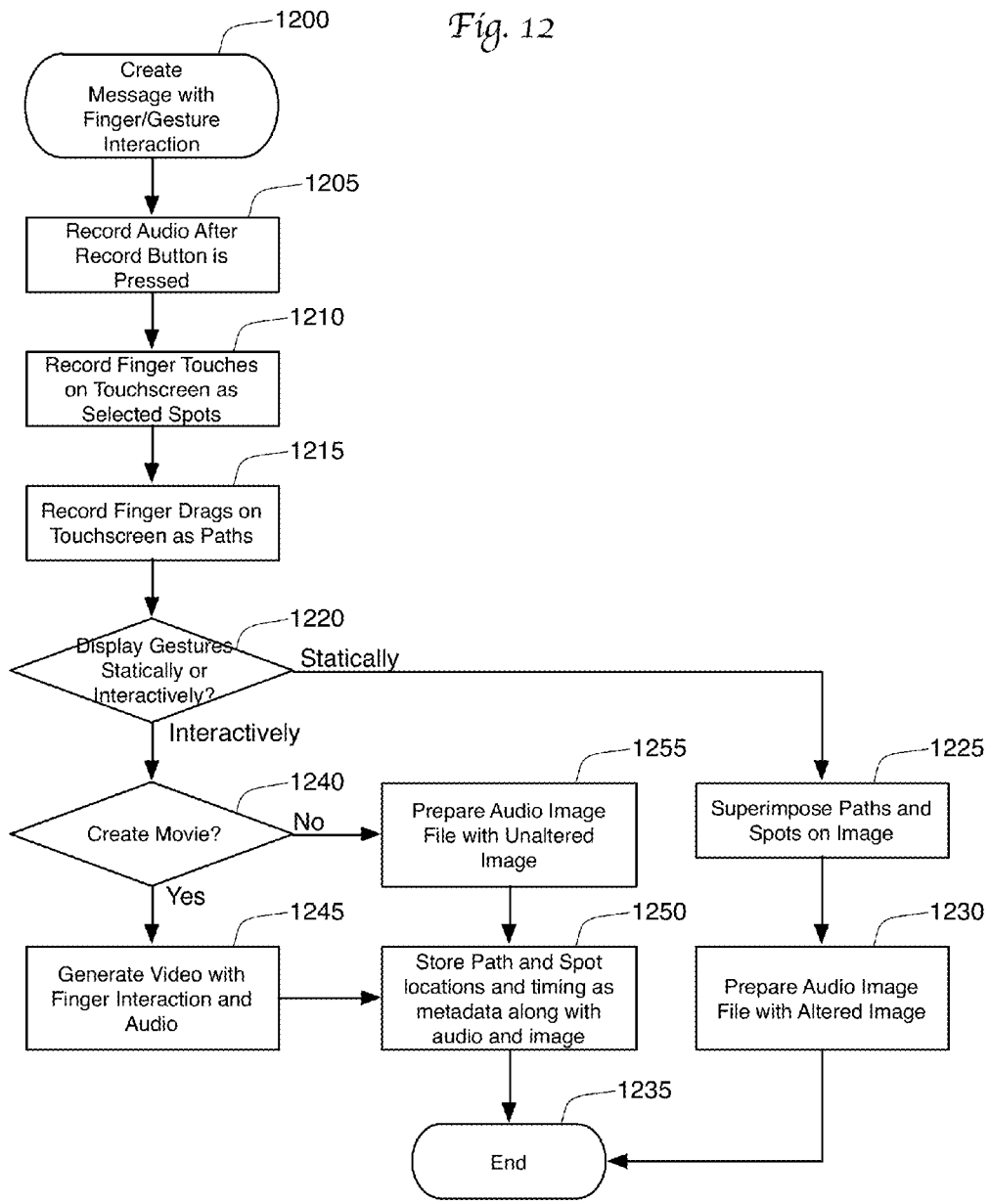
FIG. 12 is a flow chart showing a method of recording gestures in an audio-image file.

FIG. 12 shows a method 1200 that can be used to record and transmit gestures as part of an audio-image file. The method 1200 begins at step 1205, with the user pressing the record button 1040 and the app beginning to record the user's audio commentary, as described above in connection with method 700. However, this method 1200 also records all finger interactions with the image 1020 as gestures, with a single touch being recorded as a selected spot in step 1210 and finger drags along the image 1020 as paths in step 1215. In the preferred embodiment, steps 1210, 1215 record both the specific locations touched (as determined by the centerpoint of the interaction between the finger and the touchscreen 1002) but also the entire area touched by the finger. This means that heavier touches will be recorded as larger spots 1130 and wider paths 1140. In addition, steps 1210, 1215 record not only the spots 1130 and paths 1140 created by the user, but also the timing of these gestures with respect to the audio commentary. In the preferred embodiment, the timing of these gestures is recorded so that the gestures can be displayed appropriately during the playback of the audio commentary. The means that the display of the image 1020 during playback of the audio commentary will no longer remain static, but will instead interactively display the gestures at the appropriate time during the playback of the audio commentary. To allow some embodiments to remain completely static, step 1220 determines whether or not the image will display the gestures statically or interactively.

If the image is to be displayed statically, the spot and path gestures recorded at steps 1210 and 1215 are superimposed over the image 1020 to create a new static image at step 1225, much like the image shown in FIG. 11. With this new static image, the audio-image file is created using the recorded audio commentary at step 1230, effectively using method 700 described above. The method 1200 then ends at step 1235.

If the gestures 1130, 1140 are to be displayed over the image 1020 interactively at the appropriate time during the audio commentary, then the method 1200 proceeds to step 1240. This step 1240 determines whether a movie will be generated to display the gestures 1130, 1140 appropriately. As explained above, an audio-image file 300 can be created with a video track presented along side an audio track that contains the audio commentaries. To create this type of audio-image file 300, a video file is created by the app at step 1245. This video file will display the image 1020 and overlay the audio commentary. When the audio commentary reaches a location where a gesture 1130, 1140 was recorded, the app will superimpose the appropriate spot or path over the image 1020 as part of the video file. In the context of a path such as path 1140, the path 1140 can "grow" over time to match the manner in which the path input was received in step 1215. Alternatively, the entire path can appear at once in the generated video at the appropriate time. When all of the gestures 1130, 1140 have been presented over the image 1020 at the appropriate times, the image will remain static while showing the inputted gestures 1130, 1140 until all of the audio commentary is completed (including any previously created audio commentaries as explained in connection with method 800 above). At step 1250, the metadata 330 for the audio image file 300 would be supplemented with metadata about the gestures, such as the timing, location, and even finger size recorded in steps 1210 and 1215. In some embodiments, this metadata would not be added, and step 1250 would simply be skipped. The method would then end at step 1235.

In some embodiments, the audio-image app will decide at 1240 to skip the creation of a video file showing gestures 1130, 1140 at step 1245. Instead, the app will simply save the gesture data recorded at steps 1210 and 1215 as metadata within the audio image file at step 1250. In these circumstances, it will be left up to the audio-image app operating on the recipient's mobile device to utilize this metadata to present the gestures 1130, 1140 during the appropriate time of the playback of the audio commentary. One benefit of this approach is that the gestures are not permanently embedded into the audio-image in the form of a modified video track. If step 1245 were used to permanently encode the gestures into the video track, any reply commentary would use the same modified video track even though the reply commentary may not relate to the gestures themselves. If instead the unaltered image were used to create the audio-image file in step 1255, the reply commentary could reply to the unaltered image without displaying the gestures 1130, 1140. In fact, the reply commentary could include its own set of gestures that would be presented appropriately during the playback of the reply commentary. For example, the reply commentary may tell the original sender: "you should be sure to take the side trail over here," [adding a spot gesture], "so that you can see the river flowing around the bend of the canyon." The newly added spot gesture could then be displayed to the original sender when viewing the reply commentary without the original gestures 1130, 1140 confusing the situation.

The creation of the audio image file with the unaltered image in step 1255 can be accomplished as described above in connection with method 700, which would result in the creation of a video track of the original unaltered image. If this approach were taken, the audio-image app would overlay the gestures over the video track during playback of the audio commentary. Alternatively, step 1255 could avoid recording a video track altogether, and simply include the audio commentary track along with the gestures metadata and the original still image in a single file. While this type of file could not be played by a standard video playback app on a mobile device, the audio-image app could easily present the audio-commentary found in this file without the need for a video track to be present.

As shown in the menu 1070 shown FIG. 10, it is also possible for a user to add an arrow to image 1020 by selecting option 1076, or a label by selecting option 1078. The addition of an arrow or label is accomplished in much the same manner as adding gestures 1130, 1140. When adding an arrow, the user interface would simply require the user to select the beginning and ending locations for the arrow. When adding a label, the interface would request a location for the label, and then allow the user to input text to create the label at that location. Arrows and labels can be added statically or interactively, as described in connection with method 1200.

Visual Enhancements—Zoom and Crop Boxes

FIG. 10 also shows that a user may select the creation of a "box" by selecting option 1080. A box can be used to crop an image so that the recipient sees only a portion of the image during the presentation of an audio commentary. The box can also be used to zoom into a portion of the image during the audio commentary, which allows a user to discuss the entire image and then zoom into a select portion during the audio commentary.

Figure 13:
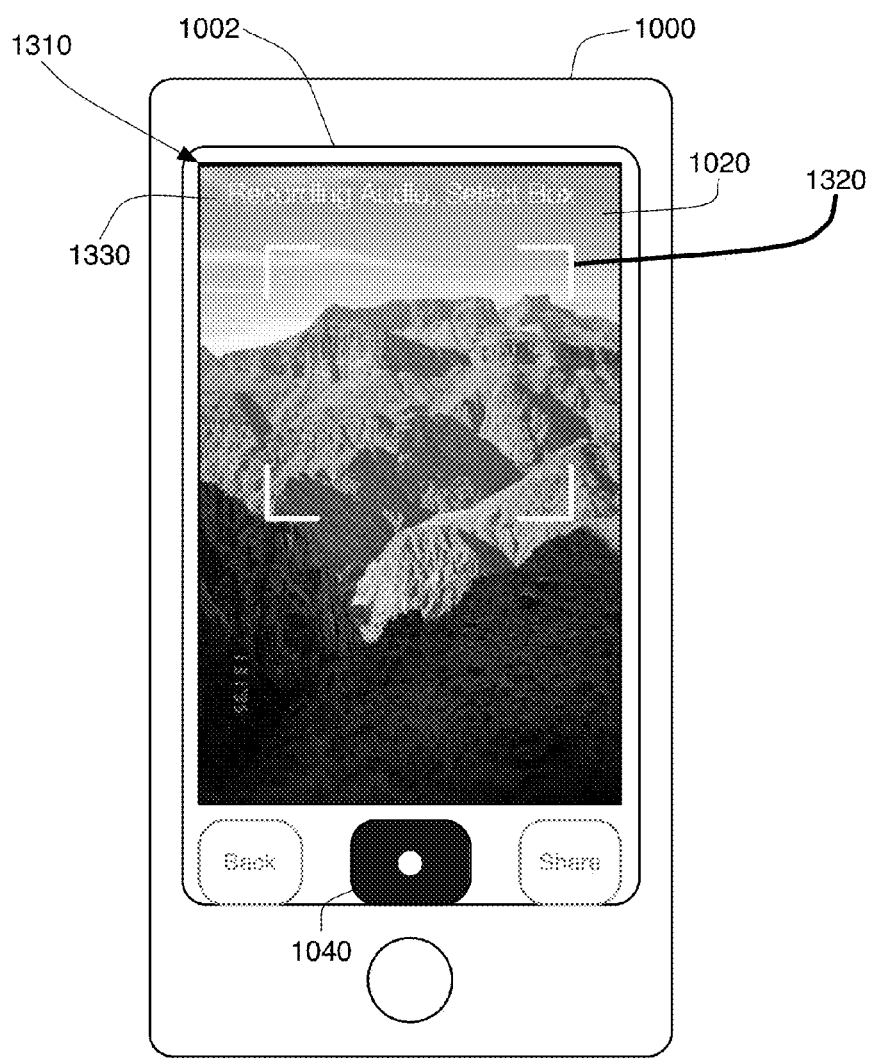
FIG. 13 is a plan view of the mobile device of FIG. 5 showing the use of a zoom box on the user interface.

When the box option 1080 is selected, the app may respond by presenting box interface 1310, as shown in FIG. 13. This interface displays a bounding box 1320 comprising four corners of a rectangle superimposed over the image 1020. The user may drag each corner around the screen 1002 until the desired portion of the image is selected. When a corner is moved, the two adjacent corners are also repositioned in order to appropriately re-size the rectangle defined by the bounding box 1320. After the corners are properly positioned, the user presses inside the box 1320 to select that portion of the image. As was the case with the gesture interface 1110, the box interface 1310 may be engaged while the user is recording audio commentary, in which case a reminder message 1330 may be displayed on screen 1002.

Figure 14:
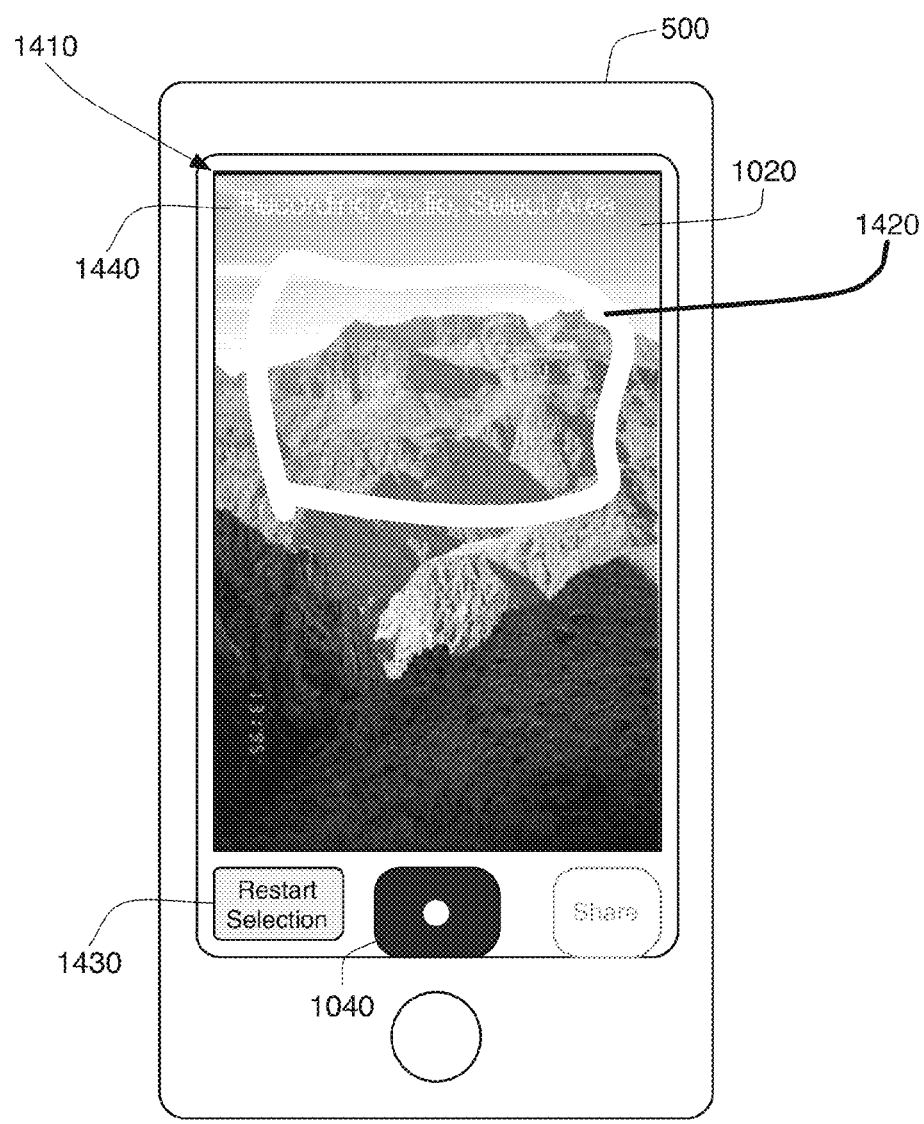
FIG. 14 is a plan view of the mobile device of FIG. 5 showing an alternate user interface for selecting a box.

FIG. 14 shows an alternative interface 1410 for selecting an area of image 1020. In this case, the user selects an area by dragging their finger around the selected area. The interface 1410 displays the path 1420 left by the finger to allow the user to see the area of the image 1020 that they are selecting. After drawing a closed loop around an area of the screen (or a portion of a closed loop that is then automatically completed by the app), the user is able to select that area by pressing inside the loop. In one embodiment, the app would then define a rectangle that approximates the size and location of the closed loop, and uses that rectangle as the selection area. If the user wishes to start drawing their closed loop again from scratch, the user merely selects the restart selection button 1430 of the interface. An instructional message 1440 may be displayed on the screen instructing the user to select an area and reminding the user that an audio commentary is also being recorded.

In some embodiments, the app may allow the user to select an area of the image 1020 with interface 1310 or 1410 before recording an audio commentary. In these embodiments, the selected image area would be treated as a crop box for the entire audio commentary. In effect, the app would replace the image 1020 by the cropped area of the image determined by box 1320 or area 1420. If the area is selected while recording audio commentary, the app preferably records the time at which the user selected the area, thereby allowing the app to zoom into the selected area at the appropriate time when playing back the audio commentary.

Figure 15:
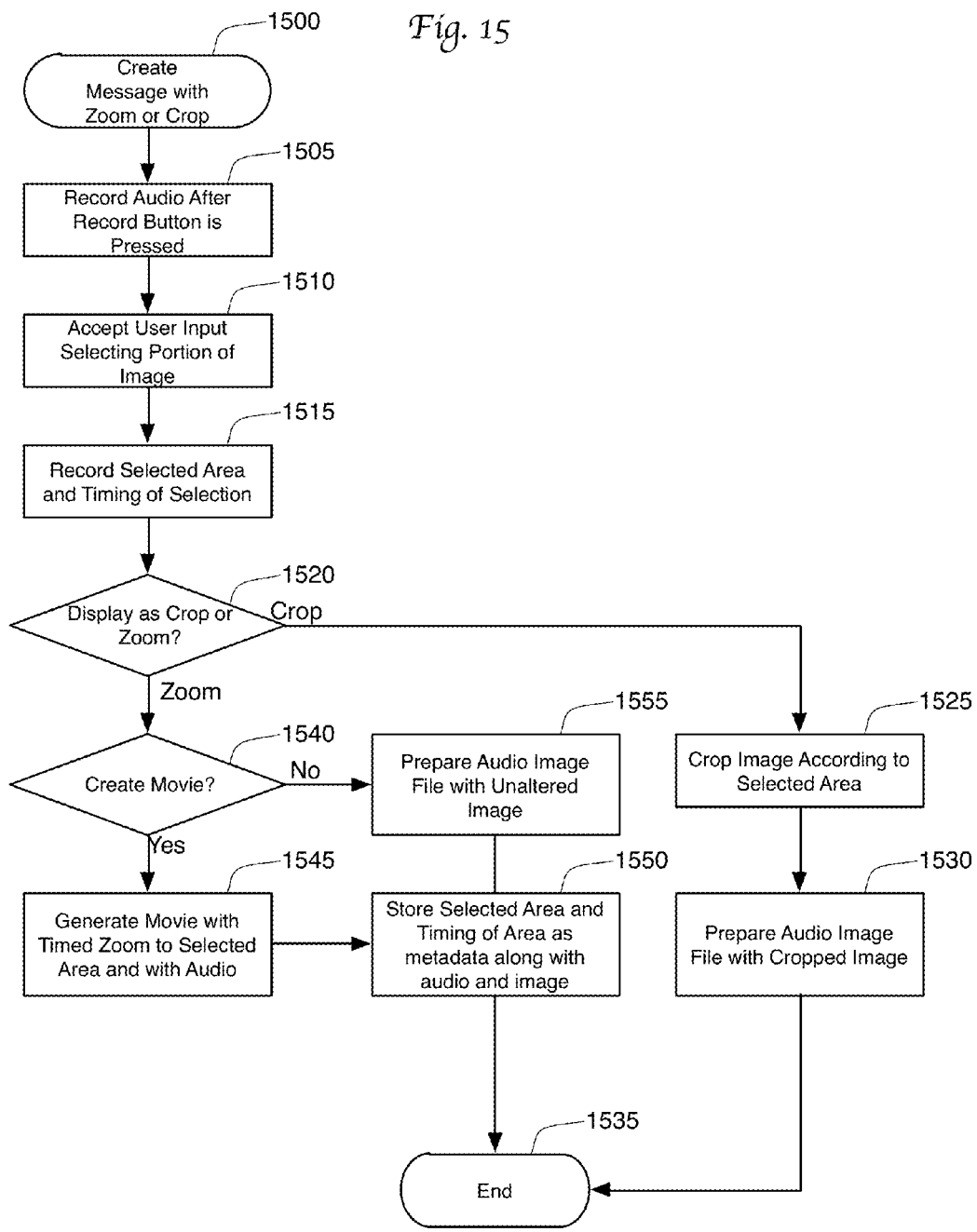
FIG. 15 is a flow chart showing a method of zooming or cropping when creating an audio-image file.

Method 1500 shown in FIG. 15 shows a process by which the app can implement this crop and zoom capability. The method 1500 starts at step 1505, at which time the mobile device 1000 begins recording an audio commentary for a user. Typically, step 1505 would initiate after the user has pressed the record button 1040. While recording this audio, step 1510 accepts input from the user selecting a portion of the displayed image 1020. This input can take the form of a bounding box 1320 described above in connection with FIG. 13, or some other indication of a selected area such as the closed loop input area 1420 described in connection with FIG. 14. In addition to recording the selection of this area 1320, 1420, step 1515 also notes the time within the recorded audio commentary that the user made this selection. This allows the selection to be presented as an appropriately timed zoom into that area during the playback of the audio commentary. For example, a user could state that they "hope to build their vacation house on this peak" and then select the area bounding their desired home site at that time. During playback, the image 1020 will zoom into the home site when the audio commentary reaches this point during playback. In other embodiments, the user may be allowed to pull-back out to the full image 1020 and even zoom into other areas of the image during their audio commentary if they so desire. This could be accomplished by providing a "zoom back out" button that becomes available after the user has selected an area of the image 1020.

At step 1520, the app determines whether the selected area should be viewed as a request to crop the image 1020 for the entire audio commentary, or a request to zoom into the selected area during the appropriate time of the commentary. This determination can be based on direct user input (i.e., an graphical user interface asking the user's preference), or on default parameters established for the app.

If step 1520 elects to view the input as a crop command, step 1525 will crop the image 1020 according to the received input area. At this point, the audio-image file will be created at step 1530 using the cropped image. The file can be created using any of the audio-image file creation methods herein. The method 1500 then ends at step 1535.

If step 1520 elects to view the input selection as a request to zoom into the selected area, step 1540 then determines whether the zoom should be permanently embedded into the audio-image file by creating a video track containing the zoom, or whether the zoom should be implemented solely through metadata and manipulation of the audio-image file during playback of the audio commentary. This determination 1540 is similar to the determination 1240 described above in connection with method 1200. If a movie is to be created, step 1545 generates the movie by starting with the entire image 1020 and zooming into the selected area (1320, 1420) only when then audio commentary reaches the appropriate point. If multiple zooms and pull-backs were recorded in step 1515, these may all be added to the video track generation of step 1545. At step 1550, the selected areas and the timing for the selection of these areas are recorded as metadata in the audio-image file, and the method 1500 stops at step 1535. As explained above in a similar context in connection with method 1200, the storage of some of this metadata information can be skipped after the movie has been created at step 1545, since the metadata is not necessary to implement the zooming enhancement.

If step 1540 determines not to create a movie/video track containing the zooming feature, step 1555 creates the audio image file with the unaltered image 1020 and simply records the selection areas and timing as metadata in step 1550. In this situation, the audio-image app 132 will handle the zooming effect based on this metadata when playing back the audio commentary.

Adding a URL

FIG. 10 also shows that a user may add a uniform resource locator (or URL) to an audio-image by selecting option 1082 in menu 1070. The URL identifies a network location over the data network 150 at which additional information or resources may be obtained, such as a website address for a particular web-page, or a network location for downloading other data or even an application over the network 150. The ability to include a URL can significantly enhance the usefulness of an audio-image file. For example, a real-estate agent using the app 132 may wish to create an audio-image file of a house that is of interest to one of their clients. The audio image file may contain an image of the house, an audio commentary from the agent describing the house, and a URL pointing to a website containing detailed listing information for that house.

Figure 16:
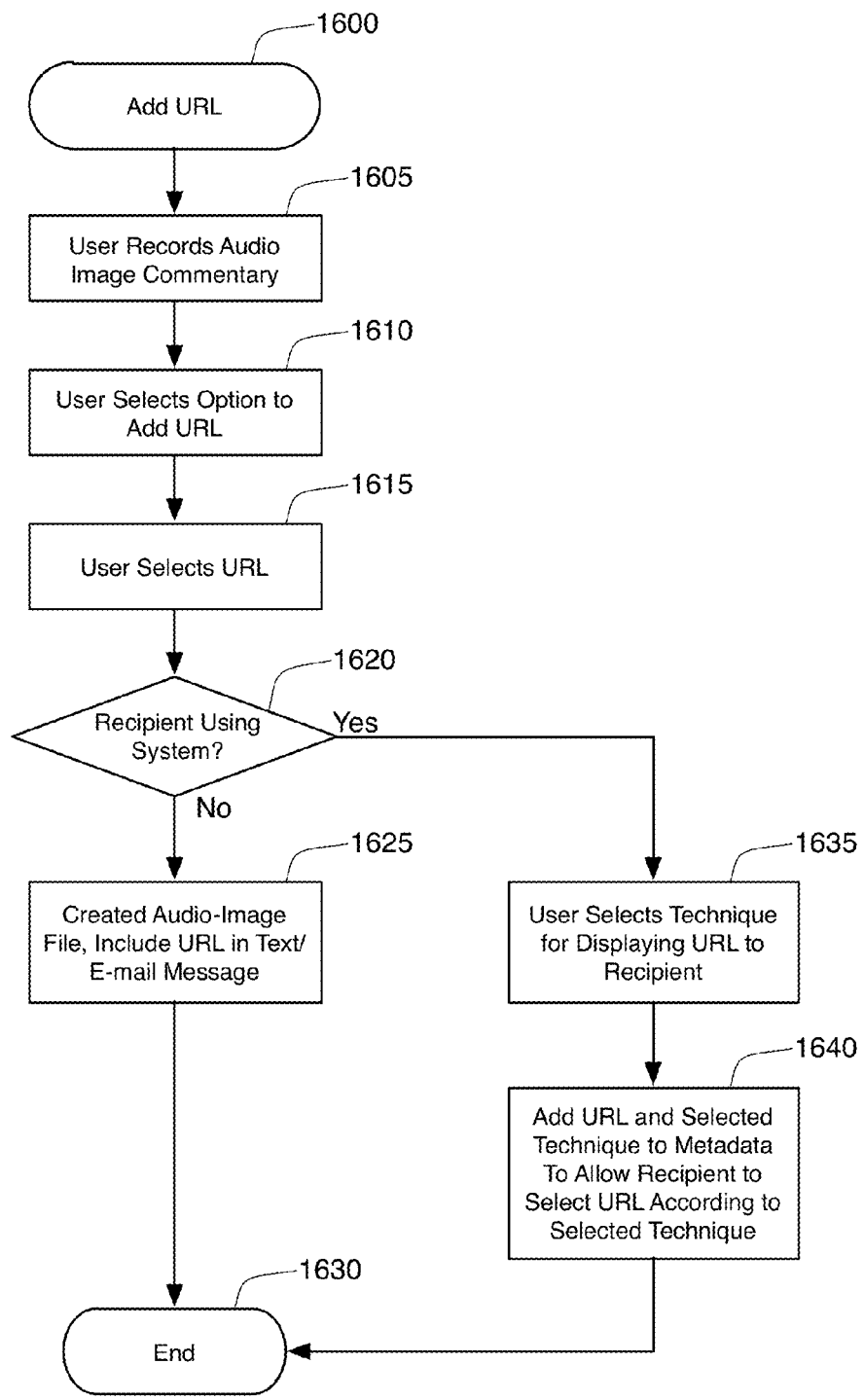
FIG. 16 is a flow chart showing a method of recording adding a URL to an audio-image file.

The flow chart in FIG. 16 describes a method 1600 that can be used to include a URL with an audio-image file. The method begins at step 1605, with the user recording an audio commentary (and any other desired augmentations) for the audio-image file using any of methods described herein. At step 1610, the user then selects the option to include a URL in the audio-image file, and then inputs the network location for the URL in step 1615. Note that these selection 1610 and input 1615 steps can occur before or during the creation of the audio-image commentary in step 1605, as well as after.

At step 1620, the app 132 must determine whether the recipient will have access to the app when displaying the audio-image file. This determination is further explained in the context of method 700 above. If the recipient is not using the system 100, step 1625 simply creates the audio-image file without the inclusion of the URL, and instead includes the URL in the MMS or e-mail message that is used to transmit the audio-image file. The app may then allow the user to include an explanatory message along with this URL, such as "See the full listing for this property at: URL." The method 1600 then ends at step 1630.

If the recipient is using the system 100, step 1635 is reached. At this step, the creator of the audio-image file may select a specific technique for presenting the URL. For example, the URL may be displayed on the mobile device screen at a particular time and location during the audio commentary. Alternatively, the commentary can end with the URL superimposed on the bottom or the middle of the image 1020. The desired presentation parameters are stored in the audio-image metadata in step 1640. These parameters will indicate when the URL should be displayed within the audio-image playback (such as at the end of the playback), and the content of any explanatory message that accompanies the URL. The recipient's app will then display the URL in the appropriate manner during playback of the audio commentary. Ideally, the displayed URL will constitute a "hot-link" to the resource linked to by the URL, so that the user need only touch the displayed URL link in order for the audio-image app to instruct the mobile device 1000 to open that resource in using the app deemed most appropriate by the operating system of the mobile device 1000. The method 1600 then ends at step 1630.

Alternatives to Single Images

Figure 17:
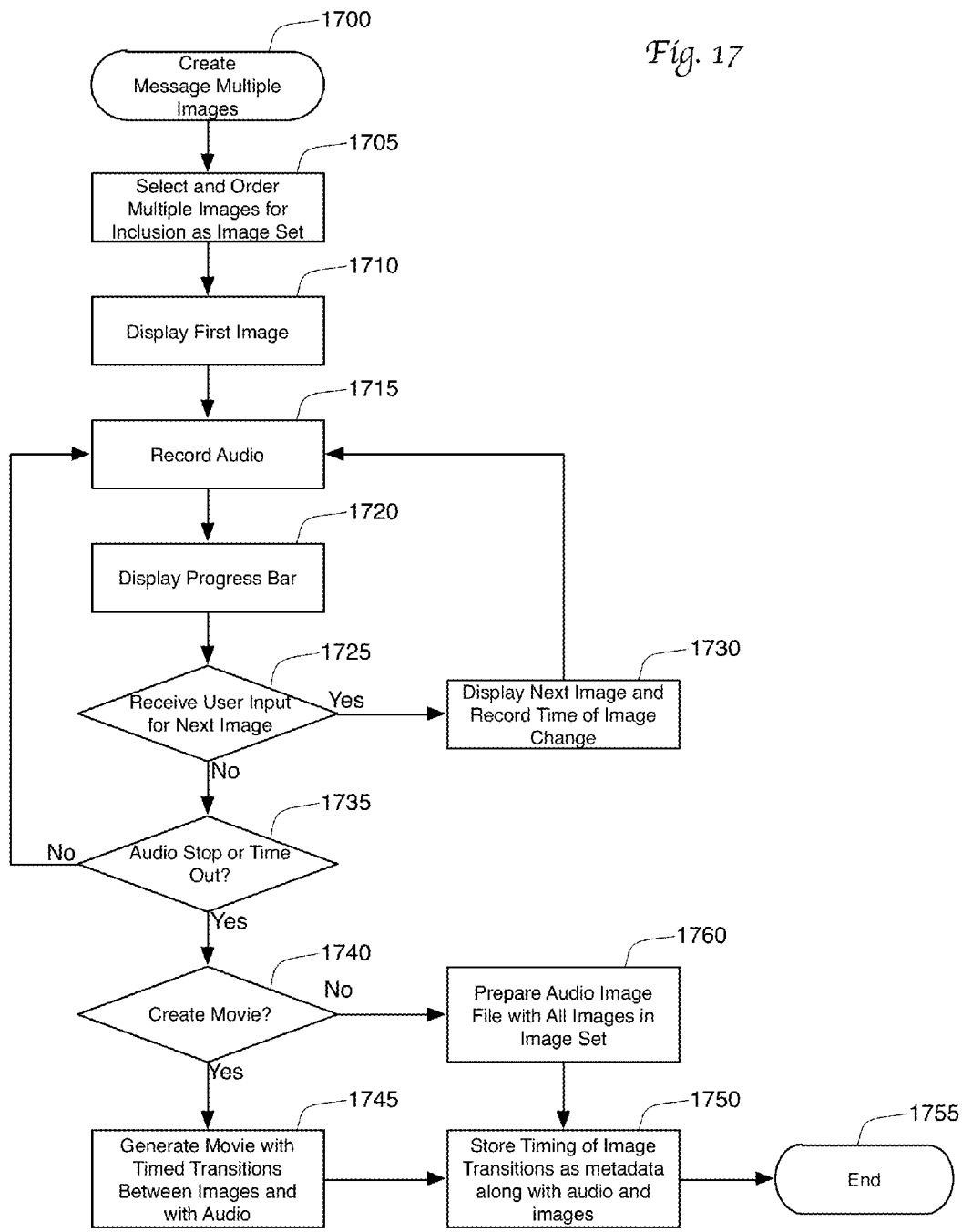
FIG. 17 is a flow chart showing a method of creating an audio-image file having multiple images.
Figure 18:
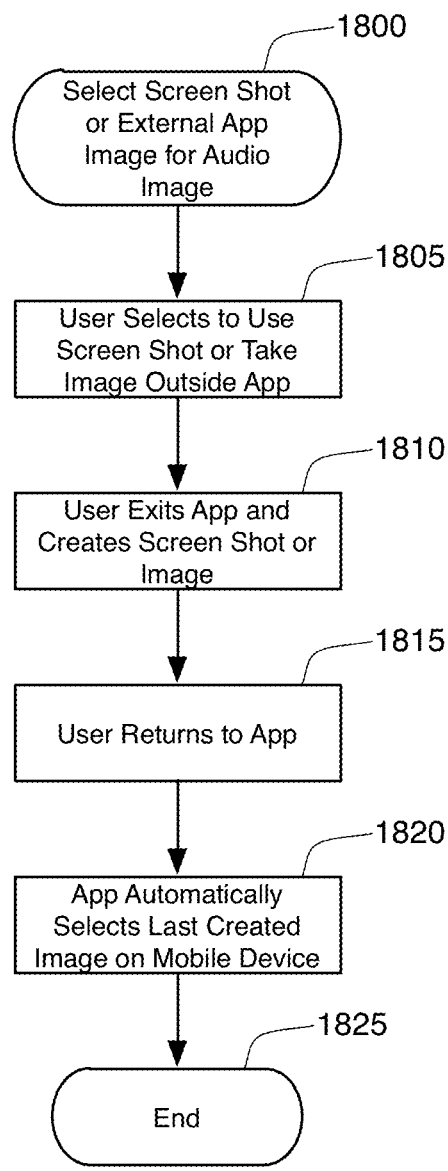
FIG. 18 is a flow chart showing a method of selecting an external image for use in an audio-image file.

In the above-described embodiments, audio-image files were created based around a single image. In FIGS. 10-16, augmentations were described to add additional elements to that image. FIG. 17 describes a process 1700 in which multiple images can be combined into a single audio-image file. The process starts at step 1705, where the creator selects a plurality of still images for inclusion as an image set. As shown in FIG. 17, this step 1705 also requests that the user sort the selected images in the image set before recording an audio commentary for the image set. This pre-sorting allows a user to easily flip between the ordered images in the image set when creating an audio commentary. This sorting can be skipped, but then it would be necessary for the user to manually select the next image to be displayed while recording the audio commentary.

After the images in the image set are selected and ordered in step 1705, the app 132 will present the first image at step 1710. When the user is ready, the user will begin recording the audio commentary at step 1715, such as by pressing the record button 1040. In the preferred embodiment, no audio commentary in an audio-image file is allowed to exceed a preset time limit. This helps to control the size of the audio-image files, and encourages more, shorter-length interchanges between parties communicating via audio-image files. While such time limits could apply to all audio-image files, they are particular useful when multiple images are selected in method 1700 because of a user's tendency to provide too much commentary for each image in the image set. As a result, method 1700 includes step 1720, in which a progress bar is constantly displayed during creation of the audio commentary indicating to the user how much time is left before they reach the maximum time for their comments.

In addition to displaying the first image and the progress bar, the app 132 will preferably present to the user a clear method for advancing to the next image in the image set. This may take the form of a simple arrow superimposed over the image. When the user taps the arrow, that interaction will be viewed as a user input to advance to the next image at step 1725. This user input could also take the form of a simple swipe gesture, which is commonly used in mobile devices to advance to a next image or page in a document. When this input is received at step 1725, the next image will be displayed at step 1730. In addition, the app 132 will record the time during the audio commentary at which the next image was displayed. The method returns to step 1715, which allows the user to continue to record their audio commentary, and step 1720, which continues to display the progress bar. If no input for the next image is received at step 1725, the method 1700 proceeds to step 1735 to determine whether audio recording should stop. An audio recording will stop if the user indicates that he or she is done recording the audio (such as by pressing record button 1040), or if the maximum time for the audio recording is reached. If step 1735 does not stop the recording, the method simply returns to step 1715 to allow for additional audio recording and advancement to additional images.

As explained above, time-limits on a user's commentary can be helpful even when only a single image is being included in an audio-image file. As a result, the steps of including of a progress bar at step 1720 and a determination as to whether a maximum time is reached at step 1735 may be included in the other methods of creating an audio-image file described herein.

If the recording is stopped at step 1735, step 1740 determines whether a video track should be created that includes the transitions between the various images in the image set. As explained above, this type of video track is required if the recipient is not using the app 132, or if the app 132 is designed to display video tracks directly. This video track will time the transitions between the images to coincide with the audio commentary based on the timings recorded at step 1730. Once the video track is created along with the audio track containing the audio commentary, step 1750 may store information about the individual images and transitions between the images in the metadata, and the process 1700 will end at step 1755. Of course, since the transitions and images are all embedded in the generated movie, it is possible that step 1750 could be skipped after the creation of the movie in step 1745.

As explained above, the receiving app 132 may use the included metadata to directly generate and display a received audio commentary rather than simply presenting a movie that was pre-generated by the sending device. If all of the recipients have access to such apps, step 1740 may elect to skip the movie generation step 1745. If so, step 1760 will create the audio image file with still images for each of the images in the image set, and then include transition information in the metadata stored with the file in step 1750. When the recipient app receives this file, it will use the metadata to determine the order of presentation of the various images, and will synchronize those images with the audio commentary as recorded by step 1730.

In alternative embodiments, the receiving app will give the receiving user some control over the playback of the audio-image file. For instance, the recipient of an audio-image file containing a plurality of images may be given the ability to swipe between the various images, allowing the user to move back-and-forth between the images as desired. The audio commentary associated with each image could still be presented for each image when the image is displayed. Obviously, if the sender used the plurality of images to tell a single story via their audio commentary, the ability to control transitions and move backwards through the presented images would disrupt the continuity of the story. In these circumstances, the sender may restrict the ability of the recipient to control transitions between images through the transmitted metadata. Alternatively, the recipient may be required to review the entire audio commentary before being able to control transitions between the images.

One disadvantage of using the movie recording created in step 1745 is that a reply commentary to the audio-image file will necessary need to either reply to a single static image (such as the last image in the image set), or reply to the entire image set using the transition timing of the original creator of the audio-image file. If the app presenting the audio-image file uses metadata rather than a video track to present the transitions between multiple images in the image set, the reply audio-commentary can be created using a new set of transitions between the images under the control of the reply commentator. This new transition metadata can be added to the audio-file metadata and used by the app when presenting the reply audio commentary. Because this is a significant benefit, the preferred embodiment of method 1700 will save the separate images and the transition metadata in step 1750 even when a movie containing the images and transitions are made in step 1745. In this way even a recipient without the app can first view the movie file created in step 1745, and then download the app, obtain a copy of the audio-image file with metadata from the server 160, and record a reply commentary with new transitions between the images.

In some circumstances, a user selecting a set of images in step 1705 may wish to obtain an image other than through capturing a new image through the app 132 or using a pre-saved image file 146. For instance, the user may wish to capture a screen display of the mobile device while operating a different app on the device, or to use a custom application to take and modify an image. Method 1800 allows this to happen by allowing a user to select an option to create an image outside of the audio-image app 132 in step 1805. The user then exits the audio-image app 132 in step 1810 and creates the image. The image can be created using the screen-shot capabilities built into the user's mobile device, or through a third-party app running on the device. When the user returns to the app 132 in step 1815, the app 132 will know that the user left the app 132 with the intention of creating a new image file. As a result, the app 132 will automatically select the last created image on the mobile device for inclusion in the audio-image file. This means that the user will not have to manually select the image from the stored image files 146 on the mobile device—the app 132 performs this step automatically. The method ends at step 1825.

Figure 19:
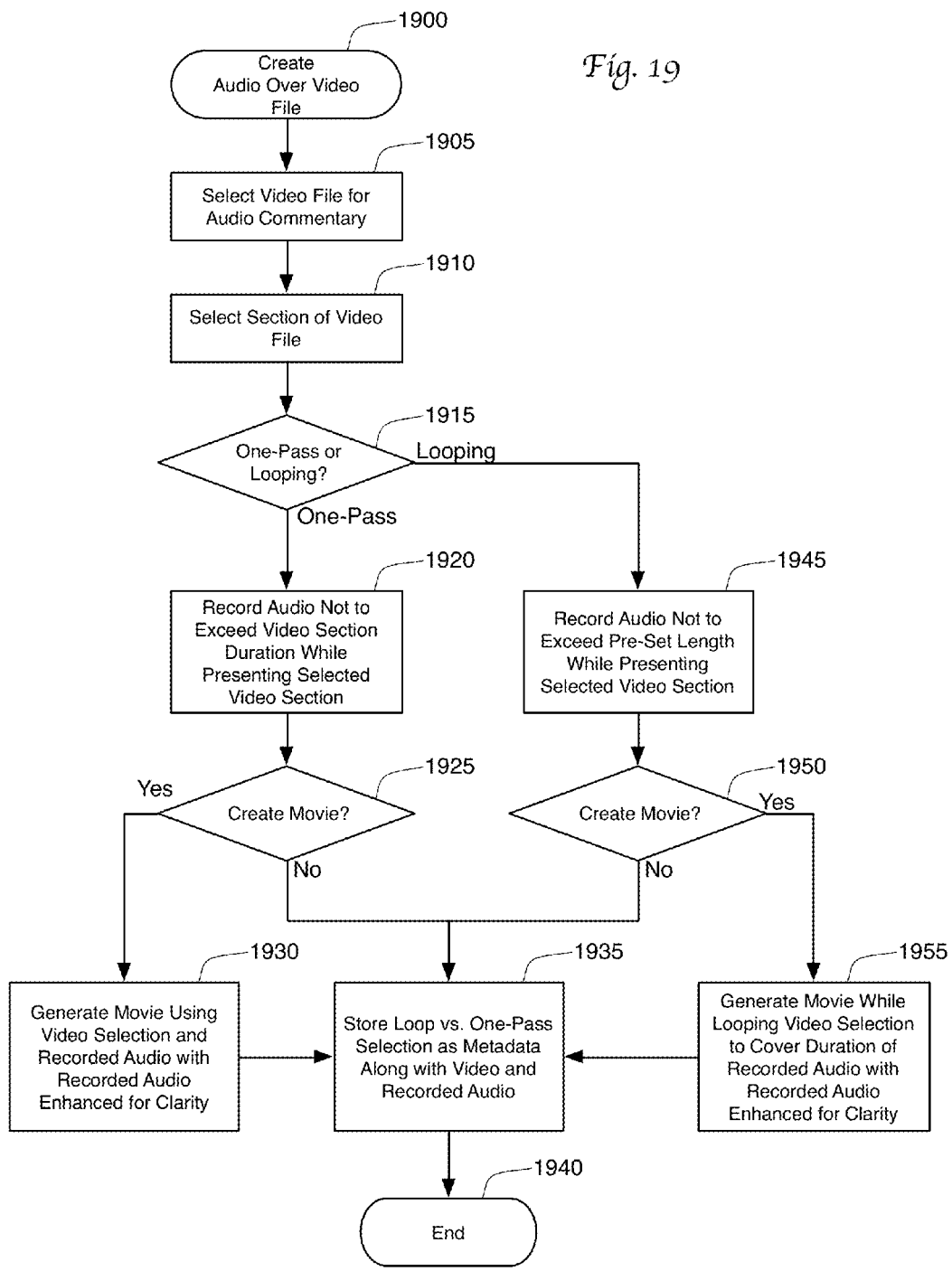
FIG. 19 is a flow chart showing a method of creating an audio-image file using a video source.

Method 1900 shown in FIG. 19 discloses a technique for using a video image file as the source file for an audio-image commentary. The method begins with the user selecting a video file for audio commentary in step 1905. The video file can be selected from video files saved on the mobile device among the stored image files 146, or can be a newly created video file created using camera 114. At step 1910, the user is given the ability to select a section of or a time slice from the original video file for commentary. This step 1910 reflects the fact that a user may not wish to comment on and transmit the entire video file selected in step 1905. Step 1910 allows the user to select a beginning and ending time for the selected section. In embodiments where each an audio-image commentary has a maximum duration time, step 1910 will ensure that the selected video segment does not exceed the allowed commentary length.

In some circumstances, the length of the section selected in step 1910 will be shorter than the audio commentary that the user desires to make. In these circumstances, the user may elect to loop the video at step 1915, which causes the video to be looped through two or more times during the recording of the audio commentary. Alternatively, the user can elect to present the selected video in one single pass.

If the user selects to present the video in one-pass, then step 1920 will present the video to the user while recording the user's audio commentary concerning the video. Since only a single pass through the video is desired, step 1920 will ensure that the audio commentary does not exceed the length of the selected video. At step 1925, the method 1900 determines whether or not a new movie will be created for the audio-image file, or whether the presentation of the audio-image will be handled entirely through metadata. If a movie is to be created, then step 1930 will use the video track of the video selected in step 1910 as the video track of the new movie file. In some cases, the video track may be recompressed into a desired video codec, while in other cases the video track can be used unaltered. Step 1930 will also generate an audio track for the movie. This audio track will include both the audio commentary recorded in step 1920, as well as the original audio from the video file segment selected in steps 1905 and 1910. In the preferred embodiment, the original audio will be deemphasized (such as by decreasing its volume), and the audio commentary will be emphasized (such as by ensuring that its volume is louder than the original audio track). In some embodiments, the creator of the audio-image file has control over the relative volumes of the audio commentary and the original audio via a slider control, and has the ability to preview and adjust the end-result before sending the file.

After generating the new movie file in step 1930, additional metadata is added to the file in step 1935. In some embodiment, this metadata will include the original audio track from the video file selected in step 1905 and the audio commentary recorded in step 1920 as separate elements, thereby allowing an app to separately present these audio tracks as necessary. In some cases, this can be accomplished by creating a custom audio image file with various elements of metadata, as described below in connection with FIG. 20. In other cases, this can be accomplished by using the mechanisms available in the type of file used to create the audio-image file. For instance, if the audio-image file is a standard-format movie file (such as an ".m4v" or ".mp4" formatted file), the separate audio elements could be stored in the movie file as separate tracks as defined by the file type.

If the user elects at step 1915 to present the video as a film loop, then step 1945 will replay the selected video repeatedly while the commentator is recording their audio commentary. As was the case with method 1800, it may be necessary to ensure that the total audio commentary does not exceed a predetermined maximum time limit, which can be accomplished using a timer and a visual progress bar presented to the user during step 1945. Step 1950 is similar to step 1925, in that the app needs to determine at step 1950 whether a movie file will be created to aid in presentation of this audio-image file. If not, the method 1900 proceeds to step 1935, where the audio commentary is included with the selected video clip in metadata within the audio-image file. The metadata will include an indication as to whether the selected video segment should be presented in one-pass, or as a looping video segment. In addition, the audio-file will separately store the recorded audio as a separate audio track. This would allow a reply-commentator to create a new audio-reply track that can be played over the original audio track of the video segment without the presence of the first audio commentary.

If step 1950 determines that a new movie file should be created, step 1955 will create that movie file by looping the video segment as frequently as necessary to present a visual image to the recorded audio commentary. As was the case with step 1930, the movie created in step 1950 will include the original audio track de-emphasized so that the newly recorded commentary can be understood while viewing the audio-image file. After step 1955, metadata can be stored in the file in step 1935, and the method 1900 will end at step 1940.

Method 1700 describes a process of creating an audio-image commentary file relating to multiple still images, while method 1900 describes a process of commenting on a particular video segment. Similar methods could be used to comment on multiple video tracks, or a combination of still images and video tracks. These methods would preferably require that the use pre-select the combination of images and video tracks and provide a presentation order for these visual elements. When the user was ready to record an audio commentary, the audio-image app would present the first visual element along with a means for the user to transition to the next element. The transitions between these elements would be recorded and stored as metadata in an audio-image file that also contained the recorded audio commentary and each of these separate visual elements.

Figure 20:
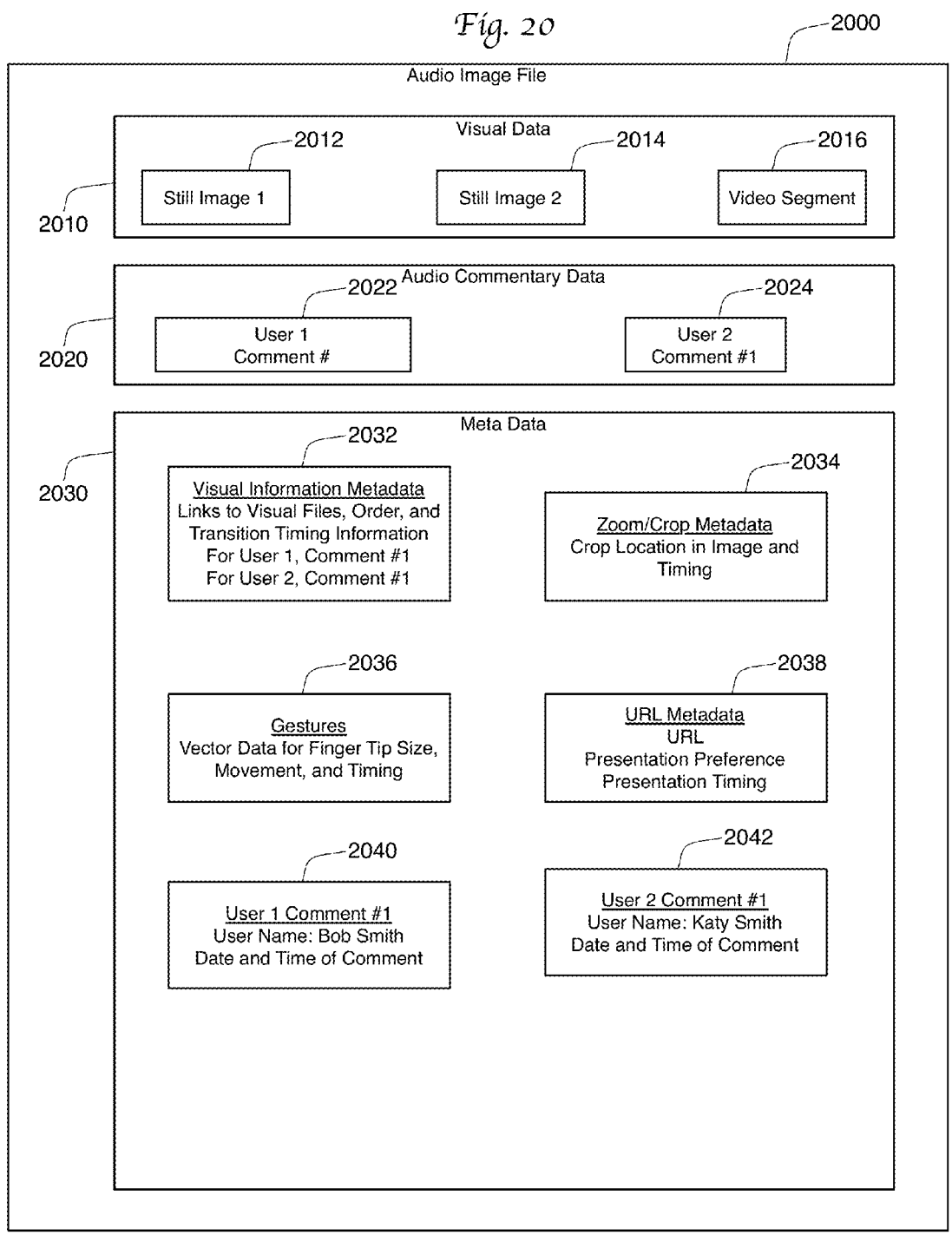
FIG. 20 is a schematic diagram showing the content of another embodiment of an audio-image file.

FIG. 20 shows an example of an audio-image file 2000 that can be utilized with an app 132 that is capable of manipulating audio and video presentation based on stored metadata. Like the audio-image file 400 shown in FIG. 4, this audio-image file 200 contains visual data 2010, audio commentary data 2020, and metadata 2030. The visual data 2010 can include one or more still images 2012, 2014 and/or one or more video segments 2016. The audio commentary data 2020 contains one or more user-recorded audio comments 2022, 2024 concerning the visual information 2010. In FIG. 20, the audio commentary data contains two audio comments, namely a first comment by "User 1" 2022, and a first comment by "User 2" 2024. In FIG. 4, multiple audio commentaries were recorded as a single audio track or file 20, and were distinguished through metadata 430. In audio-image file 2000, it is not necessary to record the separate comments 2022, 2024 as a single audio track. Instead, the commentaries can be recorded as separate tracks within a standard file format that handles multiple audio tracks. Alternatively, the audio-image file 2000 may be a specialized file format that contains and manages multiple audio segments 2022, 2024.

The metadata 2030 contains metadata 2032-2038 relating to the visual data 2010, and metadata 2040-2042 relating to the audio commentary data 2020. Metadata 2032 describes the various elements in the visual data 2010, such as still images 2012, 2014 and video segment 2016. This metadata 2032 may also describe the presentation order and timing of the different visual elements 2012-2016. In some cases, a user may elect to include certain transition effects (e.g., fade, dissolve, or swipe) between different visual elements 2012-2016, which can also be recorded in metadata 2032. As explained above, it is possible that each comment 2022, 2024 in the audio commentary data 2020 will have different transition orders and timings between the visual data 2020, so metadata 2032 may contain separate instructions for the presentation of each different commentary in the audio commentary data 2020.

Metadata 2034 contains information about zoom and cropping selections made by a user, such as through method 1500. Similarly, metadata 2036 contains gesture data (method 1200) and metadata 2038 contains URL data (method 1600). In the preferred embodiment, visual enhance metadata 2034-2038 can be related to a single audio commentary 2022, 2024 so that the enhancements will be added only during playback of that particular commentary 2022, 2024. In other embodiments, these enhancements 2034-2038 could be associated with all presentations of a particular element of visual data 2010. Metadata 2040, 2042 describe the creation of the audio commentaries 2022, 2024 respectively. For example, this metadata 2040-2042 may indicate the user that created the commentary (by name or username), and the data and that the comment was created. All of this metadata 2030 is then used by the audio-image app 132 to simultaneously present one or more comments 2022, 2024 concerning the visual data 2010, as described above.

Integration with Default Messaging Infrastructure on Mobile Device

As explained in connection with system 100 shown in FIG. 1, an audio-image app 132 is able to select an appropriate message path for an audio image file based on the capabilities and address-type of the recipient. If the recipient mobile device 168 were using the audio-image app 132, audio image data 166 could be transmitted to that device 168 through a proprietary messaging infrastructure utilizing an audio image server 160. If the recipient device 174 did not use the audio-image app 132 and was addressed via an e-mail address, the audio image file 172 would be transmitted to that device 174 as an e-mail attachment via e-mail server 170. Similarly, if the recipient device 184 was not using the audio-image app 132 and was addressed via a cellular telephone number, an audio-image file 182 would be transmitted using the MMS network 152.

Figure 21:
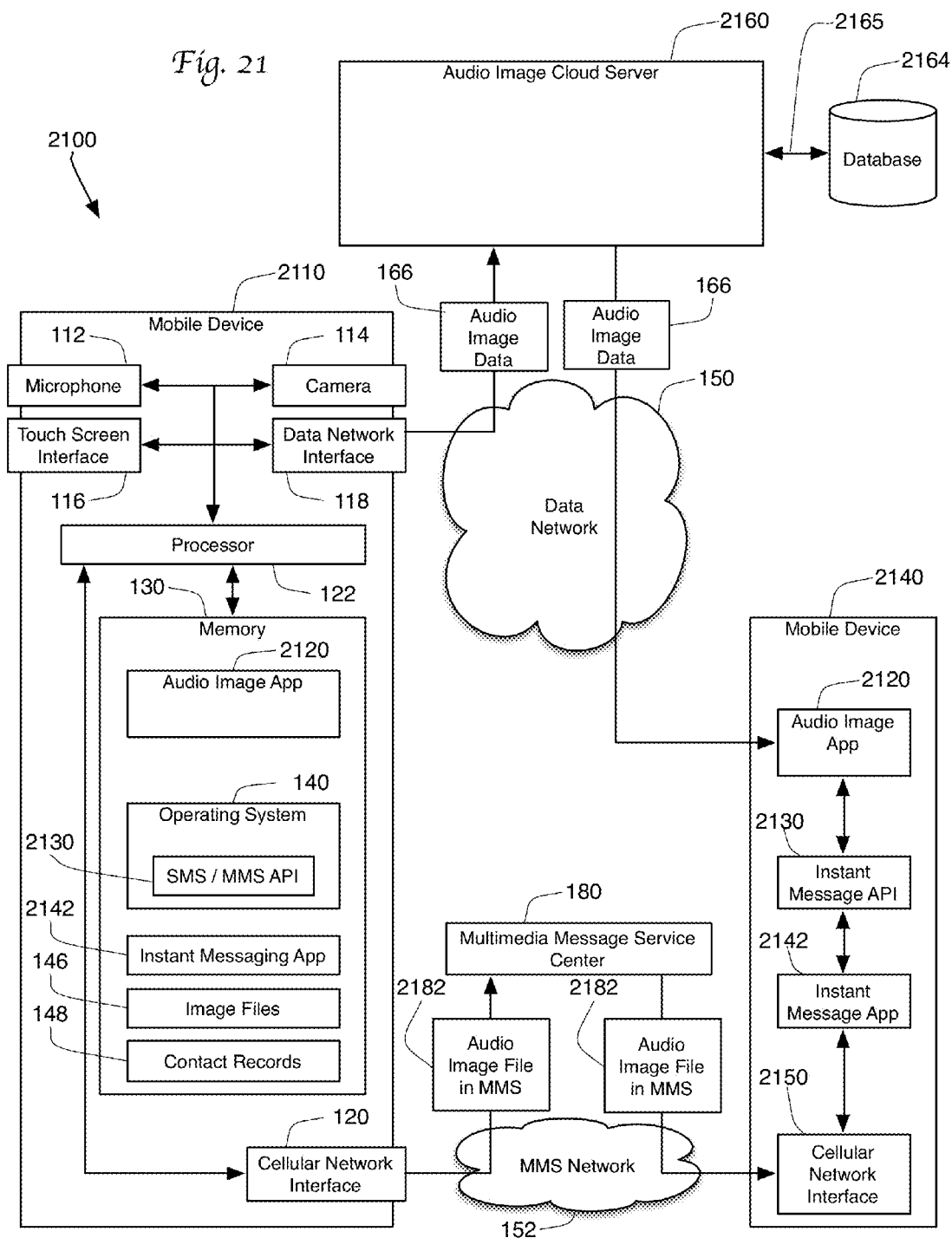
FIG. 21 is a schematic view of an alternative embodiment system utilizing the present invention.

FIG. 21 presents an alternative communication system 2100 in which audio-image files are routinely transmitted via a default instant messaging architecture, such as MMS. In FIG. 21, a mobile device 2110 is shown having numerous features in common with device 110 of FIG. 1. In fact, similar features are shown in FIG. 21 using the same reference numerals shown in FIG. 1. Thus mobile device 2110 has a microphone 112, camera 114, touch screen interface 116, data network interface 118, cellular network interface 120, processor 122, and memory 130. The mobile device 2110 uses the data network interface 118 to communicate over the data network 150, and uses the cellular network interface 120 to communicate with a MMS center 180 over the MMS network 152.

The audio-image app 2120 on device 2110 is designed to submit audio-image communications with a remote mobile device 2140 primarily over an instant messaging network such as the MMS network 152. To accomplish this, the audio-image app 2120 is specially programmed to interface with an application programming interface (or "API") 2130 for the instant messaging services provided by the mobile device 2110. In some circumstances, the API 2130 is provided by the operating system 140 of the mobile device, such as the iOS (from Apple Inc.) or ANDROID (from Google Inc.) operating systems. These operating systems provide programming interfaces for both standard MMS messaging and for operating-system specific instant messaging services (such as iMessage for iOS). The APIs allow third party apps to start an instant messaging "chat" with remote devices, to monitor incoming messages, to handle attachments on received and transmitted messages, and to otherwise integrate into the operating system's standard messaging app in a variety of useful ways.

Although the API 2130 is shown in FIG. 21 as being provided by the operating system 140, it is well within the scope of the present invention to utilize APIs that are provided by third party instant messaging services. For instance, WhatsApp (from WhatsApp Inc., Santa Clara, Calif.) is a proprietary instant messaging service that operates across multiple mobile device platforms. To utilize this service, users will typically utilize a dedicated WhatsApp app. However, the service also provides an API to allow third party apps to access various features of the WhatsApp service.

One of the primary benefits of having system 2100 utilize an existing instant messaging system to communicate audio-image files is the ability to integrate the benefits of audio-image files with the ease, convenience, and immediacy of the standard instant messaging protocols that are already familiar to users. The flowchart in FIG. 22 outlines a method 2200 for using system 2100 to send audio-image files in this manner.

A user wishing to send an audio-image file may start by opening the audio-image app 2120 directly, as was done in the methods described above. Alternatively, using system 2100, the user can start by opening the standard instant messaging app 2142 on their device 2100. This may be the Messages app on iOS, a standard messaging app provided by a telecommunications carrier on an Android phone, or a third-party app installed by the user. This messaging app 2142 itself provides a mechanism for a user to attach a file to a message intended for a recipient device 2140. The attached file may be an address book entry, a photograph, a movie, or an audio-image file. The instant messaging app 2142 would be made aware of the existence of audio-image files through its API. Typically, the audio image app 2120 would inform the messaging app 2142 of its ability to handle audio-image files when the audio-image app 2120 was first downloaded and installed on the mobile device 2110.

Figure 22:
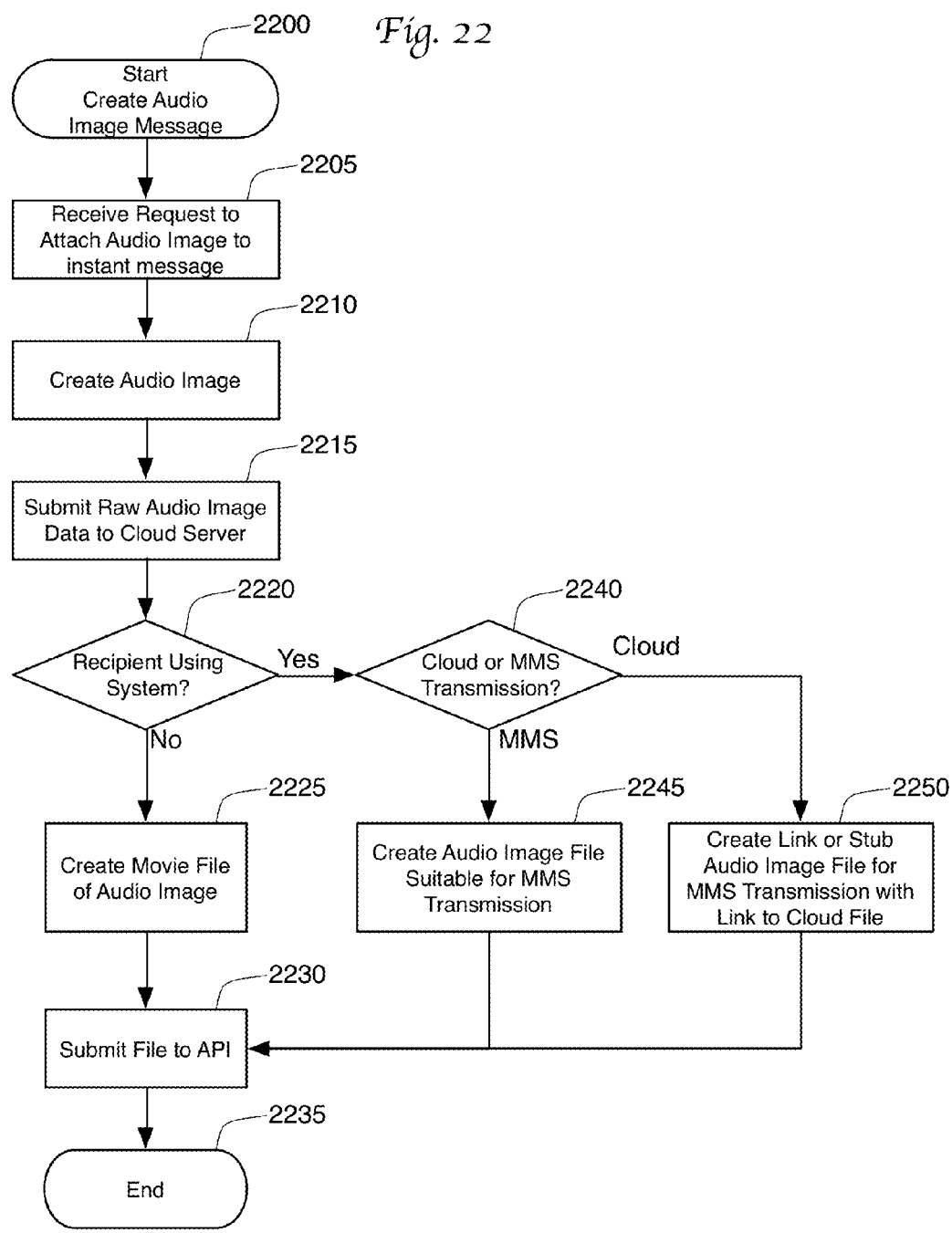
FIG. 22 is a flow chart showing a method of sending an audio-image file over an existing messaging system.

The method 2200 shown in FIG. 22 therefore starts at step 2205 when the audio-image app 2120 receives a notification from the instant messaging app 2142 that the user wishes to attach an audio-image file to an instant message. At that point, the audio-image app 2120 can assist the user in the creation of an audio-image file in step 2210. In effect, the audio-image app 2120 takes over the display interface 116 from the instant messaging app 2142 as soon as the user tells the messaging app 2142 to attach an audio-image file. The creation of the audio-image app can take place using any of the methods described above.

Once the audio-image file is created, step 2215 submits the audio-image data 166 to the audio image cloud server 2160 for saving in the audio-image database 2164. This step ensures that a recipient who does not have access to the audio-image app 2120 will be able to later retrieve the app 2120 and have full access to the raw audio image data 166, as described above in connection with method 900.

At step 2220, the method 2200 determines whether or not the recipient device 2140 is currently using the audio-image app 2120. The techniques for making this determination are also described above. If not, then the method 2200 knows that the recipient will need to view the audio-image file as a standard movie file. This will require that the app create the appropriate movie file, which occurs at step 2225. Obviously, this movie file can include one or more still images or video segments, an audio commentary, and one or more augmentations as described above. Once the movie file is created, step 2230 submits this file back to the instant messaging app 2142 through the provided API. In addition, the app 2120 will instruct the instant messaging app 2142 to include a link in the instant message text to a location where the audio-image app 2120 can be downloaded. Preferably, this message will explain that the recipient can reply to the audio-image file by downloading the app 2120 at this location, as described above. At this point, the messaging app 2142 is responsible for transmitting and delivering the audio-image file along with the requested app download location link to the recipient mobile device 2140.

In some cases, a recipient that is not using the audio-image app 2120 may be monitoring a back-and-forth conversation between two or more users that are using the audio-image app 2120 to submit reply commentaries to each other. Each communication between the users of the app 2120 will include an additional audio commentary on top of all of the previous commentaries made to the audio-image file. If the new audio commentaries are simply appended to the end of the existing audio commentaries of the movie file, this may frustrate the recipient that is not yet using the audio-image app 2120. While users of the app 2120 can easily review the latest audio commentary, the non-app-using recipient would need to review each movie file and all of the previous audio commentaries before hearing the latest contribution to the conversation. As explained above, this issue can be lessened by adding the latest contribution to the beginning of the audio track of audio-image movie as opposed to the end of the audio track. Alternatively, the system can be designed so that reply messages encode only the latest reply audio commentary as the entire audio track on the audio-image movie file that is send to non-app-using recipients. The latter approach will also help to reduce the movie's file size.

If step 2220 determines that the recipient device 2140 is using the audio image app 2120, then step 2240 determines whether or not the entire audio-image file should be attached to the instant message, or whether only a link should be provided that links to the complete audio-image file as stored in cloud-based database 2164. If the entire message is to be sent via MMS, then a complete audio-image file, such as file 2000 shown in FIG. 20, is created at step 2245. This file 2000 will include all of the visual data 2010, audio commentary data 2020, and metadata 2030 that makes up the audio image file 2000. This file is then presented through the API at step 2230 for transmission along with the instant message to the recipient device 2140. The process ends at step 2235 with this file being transmitted by the instant messaging app 2142.

If step 2240 determines that only a link should be created, then step 2250 creates this link. In one embodiment, the link takes the form of a stub file that is uniquely formatted so that the recipient device 2140 will recognize the file as an audio-image file. Rather than containing all of the visual data 2010, audio commentary 2020, and metadata 2030, the stub file may contain only a thumbnail image representing the visual data 2010 and sufficient metadata to identify the content of the audio image file (such as a message identifier). This metadata will include enough information to allow the recipient device 2140 to access to the audio-image data that was stored in the database 2164 at step 2215. This stub file is then submitted to the to the instant messaging app 2142. In other embodiments, the link is transmitted not as an attached file, but as text within the SMS message text itself. This text can take the form of a message identifier that is understood only by the audio-image app itself 2120. The app 2120 would then use this identifier to retrieve the audio-image data from the cloud server 2160.

Alternatively, the text can take the form of a URL that contains identifying information about the audio-image message (such as a message ID). All modern SMS/MMS messaging apps will present the URL as a selectable link that can be easily activated by a user. When the link is activated, the user's device 2110 will attempt to open the URL. In the preferred embodiment, the device 2110 will recognize that this type of link should be opened by the audio-image app 2120. The app 2120 will then use the identifying information to retrieve the visual data 2010, the audio commentary 2020, and the metadata 2030 from the audio image cloud server 2160. If the app 2120 is not found on the device 2110, the link can direct the user's browser to a web page created by the server 2160. This web page can provide information about the audio-image message and information about how to download the audio-image app 2120 so that the user can create an audio response to this message. In some embodiments, the server 2160 can even stream the movie file to the user's web browser so that the audio-image file can be viewed in its entirety by simply clicking on the link.

The process 2200 then ends at step 2235. At this point, the instant messaging app 2142 will take over responsibility for transmitting the submitted file to the recipient mobile device 2140 as message 2182 over SMS or MMS network 152.

The message 2182 will then be received by the instant messaging app 2142 on the recipient's mobile device 2140 using the device's cellular network interface 2150. One process 2300 for receiving and handling this message 2182 is shown in FIG. 23. The first step 2305 is for the receiving instant messaging app 2142 to display the received message and the attached file. This display will be accomplished using the standard interface of the instant messaging app 2142. If process 2200 had requested that a message and link to the download location for the audio-image app 2120 be included in the communication, this message and link would be displayed at this step 2305.

One benefit to using system 2100 is that the user need only refer to a single app 2142 to handle all of their instant messaging with their friends. Audio-image messages will be handled and inter-mixed with standard text messages within the app 2142, with the app 2142 handling message streams and conversations using its standard protocols. It is not necessary to start a separate app for audio-imaging network, and the audio-image conversations (such as those shown in FIGS. 5 and 6 above) are seamlessly integrated into the user's existing communications framework. In this way, the user need only maintain one collection of conversations, with messages created and managed by the default messaging app 2142 being in the same collection as the messages created and managed by the audio-image app 2142. In some embodiments, the audio-photo app 2142 is programmed to directly read to and write from the same database managed by the messaging app 2142 and the MMS network 152, all while adding features not present in MMS.

At step 2310, the instant messaging app 2142 receives an indication that the user desires to open the attached file. At step 2315, the app 2142 determine the file type for this attachment in order to properly handle the file. If this step 2315 determines that the attached file is a standard video file (created through step 2225), then the movie file is submitted to a video playing app residing on the recipient device 2140. The video app will then play the video file, and the method will end at step 2325.

If the attached file is an audio-image file, then the instant messaging app 2142 will know at step 2315 to submit the file to the audio-image app 2120 at step 2330. This submission will ideally occur using the API or other interface that was described above. Once the audio-image app 2120 receives the attached file, it determines at step 2335 whether the attached file includes the entire audio image file 2000 (created through step 2245), or whether the attached file is a stub file (created through step 2250). If the attachment were a stub file, the audio-image app 2120 would use the data within the file to request, at step 2340, the complete contents of the audio-image data 166 from the cloud-based database 2164. This query would be made by the audio image app 2120 through the data network 150 to the audio image cloud server 2160. When all of the audio image data 166 is received, the audio image app 2120 will play the audio image file to the recipient at step 2345. If step 2335 determined that the complete audio image file were attached to the instant message 2182, then step 2340 would be skipped and the audio image file would be played directly at step 2345.

At step 2350, the recipient is given the opportunity to create a reply audio-comment to the audio-image file. If a reply is desired, step 2355 allows the creation of the reply using any of the techniques described above. This newly created audio-image reply message would be created using method 2200, and would be resent to the original sender using the instant messaging API 2130 and app 2142. After the reply message is sent, or if step 2350 determines that no reply is desired, the method ends at step 2325.

The many features and advantages of the invention are apparent from the above description. Numerous modifications and variations will readily occur to those skilled in the art. For example, many of the above methods describe alternatives that could be removed in a simplified implementation of the present invention. FIGS. 22 and 23, for instance, allow audio-images to be sent as movie files, stub files, or full audio-image files. It would be well within the scope of the present invention to implement these methods with only one or two of these three options available in that implementation. Since such modifications are possible, the invention is not to be limited to the exact construction and operation illustrated and described. Rather, the present invention should be limited only by the following claims.

What is claimed is:

1. A computerized method comprising:
   a) at a first mobile device, presenting a plurality of still visual content items on a touchscreen display of the first mobile device;
   b) at the first mobile device and while presenting the visual content, recording an audio commentary through a microphone on the first mobile device;
   c) at the first mobile device and while recording the audio commentary:
      i) identifying user touch input on the touchscreen display at a particular time relative to the audio commentary wherein the user touch input comprises a plurality of user requests to transition to a new one of the plurality of still visual content items, and
      ii) presenting on the touchscreen display, in response to the user touch input, a visual augmentation of the visual content wherein the visual augmentation comprises visual transitions between the plurality of still images;
   d) at the first mobile device, encoding the visual content, the audio commentary and the visual augmentation into a video file;
   e) at the first mobile device, generating metadata defining the visual augmentation and the timing of the visual augmentation with respect to the audio commentary, wherein the visual augmentation is defined in metadata so as to allow the visual augmentation to be recreated solely through the metadata;

f) determining that a second mobile device is not operating a custom app capable of rendering the visual content, the audio commentary, and the visual augmentation outside of the video file and determining that a third mobile device is operating the custom app;

g) at the first mobile device and based on the determining step, transmitting the video file to the second mobile device and separately transmitting the visual content, the audio commentary, and the metadata without the video file to the third mobile device, wherein metadata is sufficient to allow the third mobile device to present the visual transitions at particular times in the audio commentary corresponding to the user touch input during recording of the audio commentary.

2. A computerized method comprising:

a) at a first mobile device, presenting a plurality of still visual content items on a touchscreen display of the first mobile device;

b) at the first mobile device and while presenting the visual content, recording an audio commentary through a microphone on the first mobile device;

c) at the first mobile device and while recording the audio commentary:
 i) identifying user touch input on the touchscreen display at a particular time relative to the audio commentary, wherein the user touch input comprises a plurality of user requests to transition to a new one of the plurality of still visual content items, and
 ii) presenting on the touchscreen display, in response to the user touch input, a visual augmentation of the visual content wherein the visual augmentation comprises visual transitions between the plurality of still images;

d) at the first mobile device, generating metadata defining the visual augmentation and the timing of the visual augmentation with respect to the audio commentary, wherein the visual augmentation is defined in metadata so as to allow the visual augmentation to be recreated solely through the metadata;

e) at the first mobile device, transmitting the visual content, the audio commentary, and the metadata to a second mobile device, f) at the second mobile device, using the metadata to recreate the visual augmentation at the particular time relative to the audio commentary when presenting the visual content and the audio commentary, wherein the second mobile device presents the visual transitions at particular times in the audio commentary corresponding to the user touch input during recording of the audio commentary.

3. The method of claim 2, wherein the first mobile device transmits the visual content items, the audio commentary, and the metadata to the second mobile device as an attachment to a message in a standard messaging protocol selected from a set consisting of: e-mail, SMS messaging, and MMS messaging.

4. The method of claim 2, wherein the first mobile device transmits the visual content items, the audio commentary, and the metadata to a remote server to be stored under a unique identifier; wherein the first mobile device further transmits the unique identifier to the second mobile device to allow the second mobile device to access the visual content items, the audio commentary, and the metadata from the remote server.

5. The method of claim 4, wherein the unique identifier is sent as a stub file attachment to a message in a standard messaging protocol selected from a set consisting of: e-mail, SMS messaging, and MMS messaging.

6. The method of claim 4, wherein the unique identifier is sent as part of a message sent in a standard messaging protocol selected from a set consisting of: e-mail, SMS messaging, and MMS messaging.

7. The method of claim 4, wherein the visual content items, the audio commentary, and the metadata are combined into a single file that is transmitted to the remote server for later download to the second mobile device.

8. The method of claim 7, wherein the single file includes a plurality of additional audio commentaries on the visual content items in addition to the audio commentary recorded by the first mobile device, wherein the metadata within the single file contains information concerning each commentary so as to allow each commentary to be separately accessible and playable.

9. The method of claim 8, wherein the visual content items are separately identified in the metadata stored in the single file.

10. The method of claim 2, wherein the metadata defines different transition timing between the separate visual content items for each of the commentaries stored in the single file.

11. The method of claim 8, wherein the metadata defines different visual augmentations for each of the commentaries stored in the single file.

12. The method of claim 1, wherein the still visual content items comprise still photographic images.

13. The method of claim 1, further comprising receiving input at the first mobile device of a URL to present at a selected time during playback of the audio commentary, wherein the step of transmitting the visual content, the audio commentary, and the visual augmentation to the second mobile device further comprises sending the URL to allow display of the URL by the second mobile device at the selected time.

14. A system for transmitting audio commentaries on video content comprising:

a) a mobile device having
 i) a microphone,
 ii) a touchscreen display,
 iii) a processor,
 iv) a network interface,
 v) non-transitory, physical memory, and
 vi) a cellular interface for communicating cellular messages with a remote mobile device;

b) cellular messaging programming on the non-transitory, physical memory providing instructions that program the processor to transmit and receive the cellular messages via the cellular interface, and to maintain a list of incoming cellular messages, the cellular messaging programming instructions including an application programming interface to receive content and commands from other programming on the mobile device and to submit content and the messages to other programming on the mobile device;

c) app programming on the non-transitory, physical memory comprising instructions that program the processor to:
 i) present a plurality of still visual content items on the touchscreen display;
 ii) while presenting the visual content, record an audio commentary through the microphone;

iii) while recording the audio commentary, identifying a plurality of user touch input requests to transition to a new one of the plurality of still visual content items;

iv) generating metadata defining the timing of the transitions between the still visual content items with respect to the audio commentary, wherein the metadata allows the transitions to be recreated in sync with the audio commentary solely through the metadata;

iv) submit messaging data including the metadata to the application programming interface for transmission to the remote mobile device through the cellular interface to allow the remote mobile device to play the transitions between the plurality of still visual content items at particular times in the audio commentary corresponding to the user touch input requests made during recording of the audio commentary.

15. The system of claim 14, wherein the app programming further programs the processor to transmit the visual content, metadata, and audio commentary via the network interface to a remote server for storage in connection with a unique message identifier, further wherein the messaging data submitted to the application programming interface comprises the unique message identifier.

16. The system of claim 15, wherein the app programming further programs the processor to receive incoming data from the remote mobile device through the application programming interface, the incoming data comprising a second message identifier, wherein the app programming programs the processor to request content from the remote server associated with the second message identifier.

17. The system of claim 16, wherein the incoming data was formatted so as to inform the cellular messaging programming to pass the incoming data to the app programming via the application programming interface.

\* \* \* \* \*